United States Patent
Jose et al.

(10) Patent No.: US 8,289,939 B2
(45) Date of Patent: Oct. 16, 2012

(54) SIGNAL COMMUNICATION COORDINATION

(75) Inventors: Bobby Jose, Veradale, WA (US);
Eduardo Casas, Vancouver (CA);
James Brennan, Sammamish, WA (US);
Praveen Mehrotra, Spokane, WA (US)

(73) Assignee: XR Communications LLC, New York, NY (US)

( * ) Notice: Subject to any disclaimer, the term of this patent is extended or adjusted under 35 U.S.C. 154(b) by 2252 days.

(21) Appl. No.: 10/700,342

(22) Filed: Nov. 3, 2003

(65) Prior Publication Data

US 2004/0223476 A1 Nov. 11, 2004

Related U.S. Application Data

(60) Provisional application No. 60/423,702, filed on Nov. 4, 2002, provisional application No. 60/423,696, filed on Nov. 4, 2002.

(51) Int. Cl.
*H04Q 7/24* (2006.01)

(52) U.S. Cl. .......................................... 370/338; 370/345

(58) Field of Classification Search .................. 370/338, 370/349, 395.5, 332, 345; 455/522, 69, 127.1
See application file for complete search history.

(56) References Cited

U.S. PATENT DOCUMENTS

| | | | |
|---|---|---|---|
| 5,559,795 A * | 9/1996 | Ahl | ................................ 370/342 |
| 5,771,017 A | 6/1998 | Dean et al. | |
| 5,809,141 A | 9/1998 | Dent et al. | |
| 5,987,037 A | 11/1999 | Gans | |
| 6,091,788 A | 7/2000 | Keskitalo et al. | |
| 6,108,323 A | 8/2000 | Gray | |
| 6,169,910 B1 | 1/2001 | Tamil et al. | |
| 6,252,544 B1 | 6/2001 | Hoffberg | |
| 6,311,075 B1 | 10/2001 | Bevan et al. | |
| 6,429,812 B1 | 8/2002 | Hoffberg | |
| 6,438,376 B1 | 8/2002 | Elliott et al. | |
| 6,470,195 B1 | 10/2002 | Meyer | |
| 6,611,695 B1 | 8/2003 | Periyalwar | |
| 6,628,235 B2 | 9/2003 | Wight | |
| 6,807,146 B1 * | 10/2004 | McFarland | .................... 370/208 |
| 6,983,167 B2 * | 1/2006 | Adachi et al. | ................. 455/522 |
| 6,990,082 B1 * | 1/2006 | Zehavi et al. | ................. 370/280 |
| 7,177,294 B2 * | 2/2007 | Chen et al. | .................... 370/338 |
| 7,233,602 B2 * | 6/2007 | Chen et al. | .................... 370/445 |
| 7,239,615 B2 * | 7/2007 | Nevo et al. | .................... 370/278 |

(Continued)

FOREIGN PATENT DOCUMENTS

WO    WO 99/21391    4/1999

*Primary Examiner* — Chuong T Ho

(74) *Attorney, Agent, or Firm* — Mintz, Levin, Cohn, Ferris, Glovsky and Popeo, P.C.

(57) ABSTRACT

An exemplary access station for wireless communications includes: a wireless input/output unit that is configured to establish multiple access points; and signal transmission/reception coordination logic that is capable of ascertaining that an access point of the multiple access points is receiving a signal and that is adapted to restrain at least one other access point of the multiple access points from transmitting another signal responsive to the ascertaining that the access point is receiving the signal. An exemplary method includes: monitoring multiple respective indicators acquired from multiple respective baseband units; detecting whether at least one respective indicator of the multiple respective indicators is affirmatively indicating that a signal is being received; and if so, providing at least one instruction to at least two medium access controllers of multiple respective medium access controllers, the at least one instruction restraining the at least two medium access controllers from causing a transmission.

35 Claims, 12 Drawing Sheets

U.S. PATENT DOCUMENTS

| | | | |
|---|---|---|---|
| 7,779,071 B2* | 8/2010 | Lor et al. | 709/203 |
| 2001/0033600 A1 | 10/2001 | Yang et al. | |
| 2002/0031104 A1* | 3/2002 | Griffith et al. | 370/329 |
| 2002/0136183 A1* | 9/2002 | Chen et al. | 370/338 |
| 2003/0064752 A1* | 4/2003 | Adachi et al. | 455/560 |
| 2003/0214961 A1* | 11/2003 | Nevo et al. | 370/401 |
| 2004/0063468 A1 | 4/2004 | Frank | |

* cited by examiner

SIGNAL COMMUNICATION COORDINATION

RELATED PATENT APPLICATIONS

This U.S. Non-provisional Application for Letters Patent claims the benefit of priority from (i) co-pending U.S. Provisional Application for Letters Patent Ser. No. 60/423,702 (filed Nov. 4, 2002) and (ii) co-pending U.S. Provisional Application for Letters Patent Ser. No. 60/423,696 (filed Nov. 4, 2002).

Specifically, this U.S. Non-provisional Application for Letters Patent claims the benefit of priority from, and hereby incorporates by reference herein the entire disclosure of, co-pending U.S. Provisional Application for Letters Patent Ser. No. 60/423,702, filed Nov. 4, 2002, and entitled "Synchronizing Media Access Control (MAC) Controllers".

Specifically, this U.S. Non-provisional Application for Letters Patent also claims the benefit of priority from, and hereby incorporates by reference herein the entire disclosure of, co-pending U.S. Provisional Application for Letters Patent Ser. No. 60/423,696, filed Nov. 4, 2002, and entitled "Multi-Mac Control Techniques".

TECHNICAL FIELD

This disclosure relates in general to the coordination of signals being communicated across one or more media and in particular, by way of example but not limitation, to preventing the thrashing of signals (e.g., packets) by coordinating the release of downlink packets with the reception of uplink packets using a media access control (MAC)-type mechanism.

BACKGROUND

So-called local area networks (LANs) have been proliferating to facilitate communication since the 1970s. Certain LANs (e.g., those operating in accordance with IEEE 802.3) have provided enhanced electronic communication through wired media for decades. Since the late 1990s, LANs have expanded into wireless media so that networks may be established without necessitating wire connections between or among various network elements. Such LANs may operate in accordance with IEEE 802.11 (e.g., 802.11(a), (b), (e), (g), (k), (n), etc.) or other wireless network standards.

Although standard LAN protocols, such as Ethernet, may operate at fairly high speeds with inexpensive connection hardware and may bring digital networking to almost any computer, wireless LANs can often achieve the same results more easily and/or at a lower cost. Furthermore, wireless LANs provide increased mobility, flexibility, and spontaneity when setting up a network for two or more devices.

In wireless communication generally, signals are sent from a transmitter to a receiver using electromagnetic waves that emanate from an antenna. With a standard wireless LAN, for example, these electromagnetic waves are sent equally in all directions from a central point of emanation. Receiving devices positioned at any angle with respect to the emanating point that are sufficiently close thereto may participate in the wireless LAN. As a result, both infrastructure and ad-hoc wireless networks may be established.

However, there are drawbacks to such standard omni-directional wireless LANs or omni-directional wireless wide area networks (WANs). For example, transmission range is limited, electromagnetic interference is unmanaged, network congestion may grow ungoverned, and the likelihood of packet collisions is unbounded. Furthermore, inefficiencies may multiply unchecked if two or more centralized points of emanation happen to be positioned so as to have overlapping coverage areas or are otherwise sufficiently proximate to one another.

Accordingly, there is a need for schemes and/or techniques for at least partially ameliorating one or more of the above mentioned drawbacks and/or inefficiencies.

SUMMARY

In an exemplary access station implementation, an access station for wireless communications includes: a wireless input/output (I/O) unit that is configured to establish multiple access points; and signal transmission/reception coordination logic that is capable of ascertaining that an access point of the multiple access points is receiving a signal and that is adapted to restrain at least one other access point of the multiple access points from transmitting another signal responsive to the ascertaining that the access point is receiving the signal.

In an exemplary system implementation, a system for wireless communications includes: medium access controller coordination logic capable of accepting multiple respective receive indicators from multiple respective baseband units; the medium access controller coordination logic adapted to combine the multiple respective receive indicators to produce multiple constructive receive indicators, each constructive receive indicator of the multiple constructive receive indicators indicating that one or more respective baseband units of the multiple respective baseband units is receiving a signal; the medium access controller coordination logic further adapted to provide the multiple constructive receive indicators to multiple medium access controllers.

In an exemplary method implementation, a method includes: monitoring multiple respective indicators acquired from multiple respective baseband units; detecting whether at least one respective indicator of the multiple respective indicators is affirmatively indicating that a signal is being received; and if so, providing at least one instruction to at least two medium access controllers of multiple respective medium access controllers, the at least one instruction restraining the at least two medium access controllers from causing a transmission.

BRIEF DESCRIPTION OF THE DRAWINGS

The same numbers are used throughout the drawings to reference like and/or corresponding aspects, features, and components.

DETAILED DESCRIPTION

Figure 1:
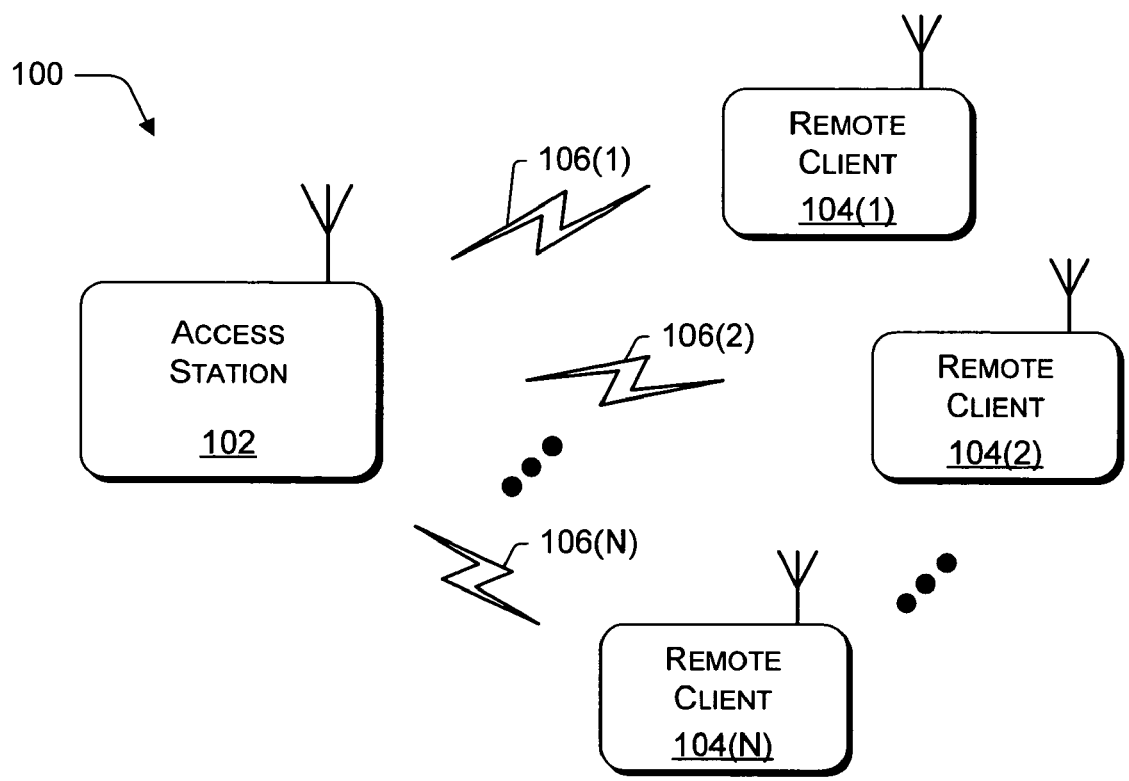
FIG. 1 is an exemplary general wireless communications environment.

FIG. 1 is an exemplary general wireless communications environment 100. Wireless communications environment 100 is representative generally of many different types of wireless communications environments, including but not limited to those pertaining to wireless personal area networks (PANs) (e.g., Wi-Media, IEEE 802.15, etc.) or wireless local area networks (LANs) (e.g., Wifi) or wide area networks (WANs) (e.g., Wi-Fi, WiMax, etc.) technology, cellular technology, trunking technology, and so forth.

In wireless communications environment 100, an access station 102 is in wireless communication with remote clients 104(1), 104(2) . . . 104(N) via wireless communications or communication links 106(1), 106(2) . . . 106(N), respectively. Although not required, access station 102 is typically fixed, and remote clients 104 are typically mobile. Also, although only three remote clients 104 are shown, access station 102 may be in wireless communication with many such remote clients 104 via uplink wireless communications 106 transmitted from remote clients 104 to access station 102 and via downlink wireless communications 106 transmitted from access station 102 to remote clients 104.

With respect to a so-called Wi-Fi wireless communications system, for example, access station 102 and/or remote clients 104 may operate in accordance with any IEEE 802.11 or similar standard. With respect to a cellular system, for example, access station 102 and/or remote clients 104 may operate in accordance with any analog or digital standard, including but not limited to those using time division/demand multiple access (TDMA), code division multiple access (CDMA), spread spectrum, some combination thereof, or any other such technology.

Access station 102 may be, for example, a nexus point, a trunking radio, a base station, a Wi-Fi switch, an access point, some combination and/or derivative thereof, and so forth. Remote clients 104 may be, for example, a hand-held device, a desktop or laptop computer, an expansion card or similar that is coupled to a desktop or laptop computer, a personal digital assistant (PDA), a mobile phone, a vehicle having a wireless communication device, a tablet or hand/palm-sized computer, a portable inventory-related scanning device, any device capable of processing generally, some combination thereof, and so forth. Remote clients 104 may operate in accordance with any standardized and/or specialized technology that is compatible with the operation of access station 102.

Figure 2:
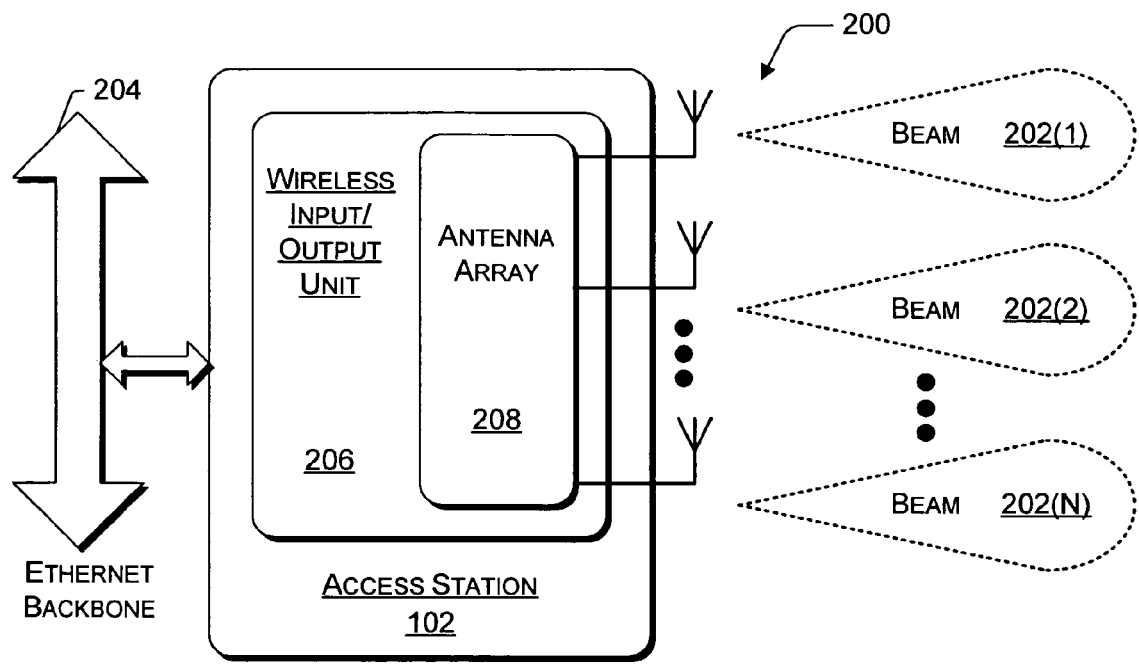
FIG. 2 is an exemplary wireless LAN/WAN communications environment that includes an access station, a wireless input/output (I/O) unit, an antenna array, and multiple communication beams.

FIG. 2 is an exemplary wireless LAN/WAN communications environment 200 that includes an access station 102, a wireless input/output (I/O) unit 206, an antenna array 208, and multiple communication beams 202. Wireless LAN/WAN communications environment 200 may operate in accordance with, for example, a Wi-Fi-compatible or similar standard. Thus, in such an implementation, exemplary access station 102 may operate in accordance with a Wi-Fi-compatible or similar standard. Access station 102 is coupled to an Ethernet backbone 204. Access station 102, especially because it is illustrated as being directly coupled to Ethernet backbone 204 without an intervening external Ethernet router or switch, may itself be considered a Wi-Fi switch.

Access station 102 includes wireless I/O unit 206. Wireless I/O unit 206 includes an antenna array 208 that is implemented as two or more antennas, and optionally as a phased array of antennas. Wireless I/O unit 206 is capable of transmitting and/or receiving (i.e., transceiving) signals (e.g., wireless communication(s) 106 (of FIG. 1)) via antenna array 208. These wireless communication(s) 106 are transmitted to and received from (i.e., transceived with respect to) a remote client 104 (also of FIG. 1). These signals may be transceived directionally with respect to one or more particular communication beams 202.

In wireless communication, signals may be sent from a transmitter to a receiver using electromagnetic waves that emanate from one or more antennas as focused in one or more desired directions, which contrasts with omni-directional transmission. When the electromagnetic waves are focused in a desired direction, the pattern formed by the electromagnetic wave is termed a "beam" or "beam pattern." The production and/or application of such electromagnetic beams is typically referred to as "beamforming."

Beamforming may provide a number of benefits such as greater range and/or coverage per unit of transmitted power, improved resistance to interference, increased immunity to the deleterious effects of multipath transmission signals, and so forth. Beamforming can be achieved using any of a number of active and passive beamformers. Exemplary beamformers are described further below with reference to FIG. 6.

By using such a beamformer along with antenna array 208, multiple communication beams 202(1), 202(2) . . . 202(N) may be produced by wireless I/O unit 206. Although three beams 202(1, 2, N) are illustrated with three antennas of antenna array 208, it should be understood that the multiple antennas of antenna array 208 work in conjunction with each other to produce the multiple beams 202(1, 2 . . . N). An exemplary set of communication beam patterns is described further below with reference to FIG. 3.

Figure 3:
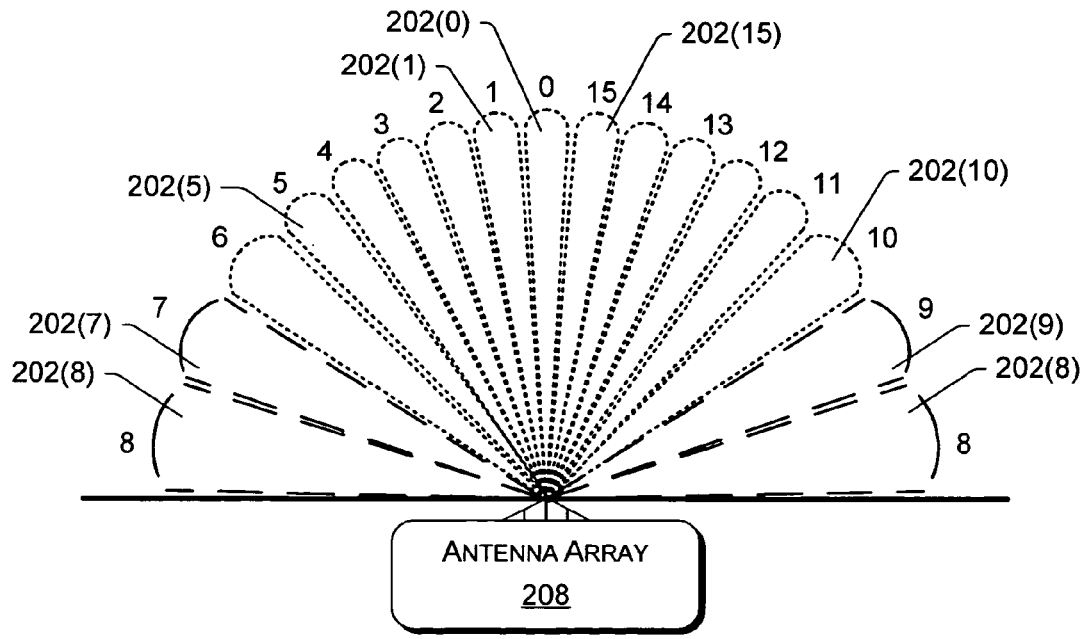
FIG. 3 illustrates an exemplary set of communication beams that emanate from an antenna array as shown in FIG. 2.

FIG. 3 illustrates an exemplary set of communication beams 202 that emanate from an antenna array 208 as shown in FIG. 2. In a described implementation, antenna array 208 includes sixteen antennas 208(0, 1 . . . 14, and 15) (not explicitly shown in FIG. 2). From the sixteen antennas 208 (0 . . . 15), sixteen different communication beams 202(0), 202(1) . . . 202(14), and 202(15) are formed as the wireless signals emanating from antennas 208 add and subtract from each other during electromagnetic propagation. It should be noted that the exemplary set of communication beams 202 are a pictorial representation and that the illustrated shapes do not necessarily bear any relationship to the actual shape(s) of beam(s) which may include a main beam and several side lobes (e.g., with fixed beam forming) or an arbitrary shape of coverage (e.g., with adaptive beam forming).

Communication beams 202(1) . . . 202(15) spread out symmetrically from the central communication beam 202(0). The narrowest beam is the central beam 202(0), and the beams become wider as they spread outward from the center. For example, beam 202(15) is slightly wider than beam 202(0), and beam 202(5) is wider than beam 202(15). Also, beam 202(10) is wider still than beam 202(5). It should be understood that the set of communication beam patterns illustrated in FIG. 3 are exemplary only and that other communication beam pattern sets may differ in width, shape, number, angular coverage, and so forth. By way of example only, an access station may alternatively utilize six beams (that are emanating from an antenna array having eight elements), three beams, and so forth.

Due to real-world effects of the interactions between and among the wireless signals as they emanate from antenna array 208 (e.g., assuming a linear antenna array in a described implementation), communication beam 202(8) is degenerate such that its beam pattern is formed on both sides of antenna array 208. These real-world effects also account for the increasing widths of the other beams 202(1 . . . 7) and 202(15 . . . 9) as they spread outward from central beam 202(0). In fact, in a described implementation, communication beams 202(7) and 202(9) are too wide for efficient and productive use. Hence, communication beams 202(7), 202(8), and 202(9) are not utilized in a described implementation. Such an implementation that utilizes thirteen communication beams 202 (e.g., beams 202(0 . . . 6) and beams 202(10 . . . 15)) is described further below with reference to FIG. 8.

Figure 4:
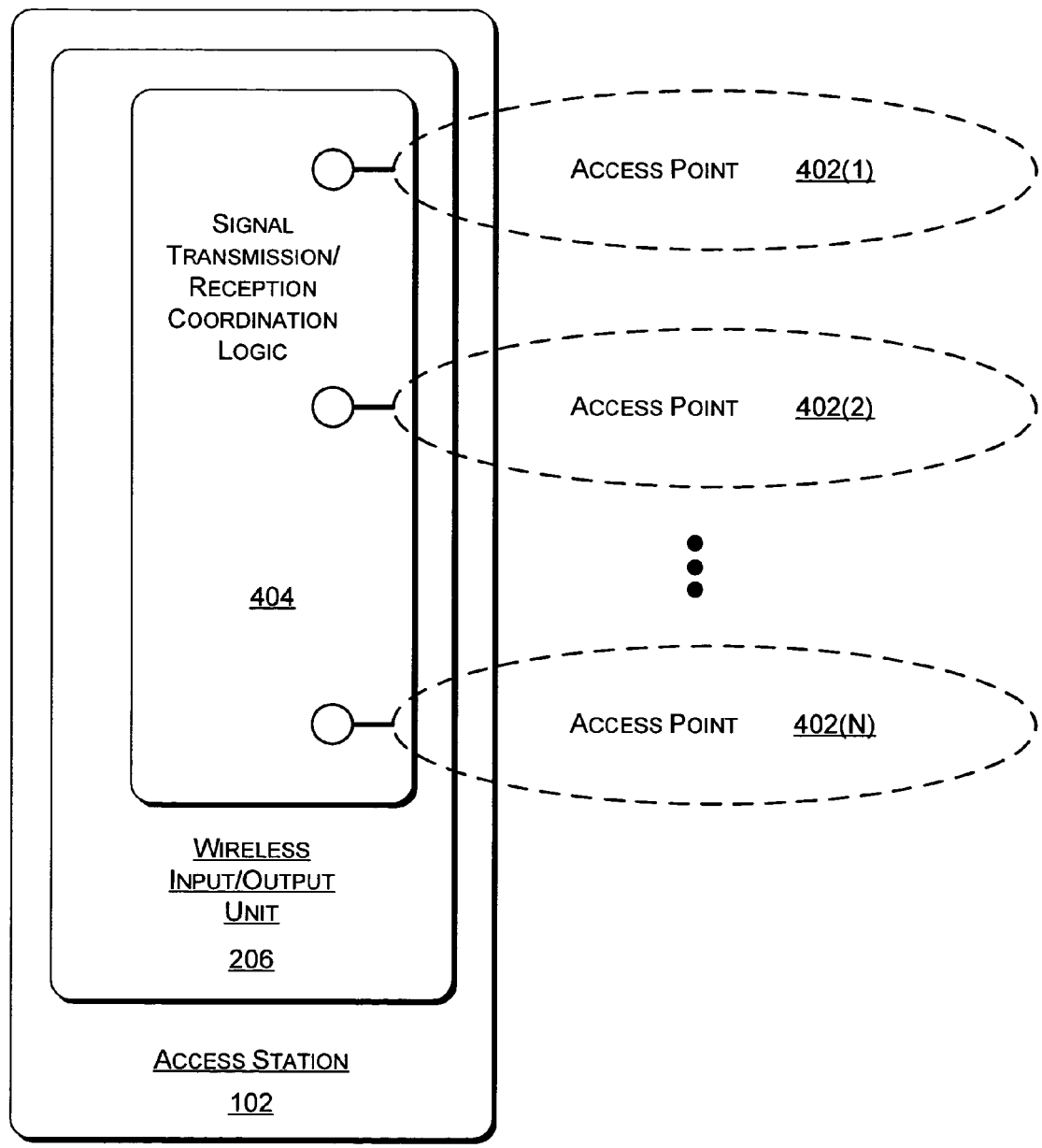
FIG. 4 illustrates an exemplary access station that establishes multiple access points and includes signal transmission/reception coordination logic.

FIG. 4 illustrates an exemplary access station 102 that establishes multiple access points 402 and includes signal transmission/reception coordination logic 404. As illustrated, access station 102 includes a wireless I/O unit 206. Wireless I/O unit 206 includes or is associated with signal transmission/reception coordination logic 404. Such logic may be implemented as hardware, software, firmware, some combination thereof, and so forth.

In a described implementation, wireless I/O unit 206 establishes two or more access points 402, such as multiple access points 402(1), 402(2) . . . 402(N). Each access point of the multiple access points 402 may correspond to, for example, an individual access point in accordance with an IEEE 802.11-based standard. Additionally, a wireless coverage area or region for each respective access point 402 of the multiple access points 402 may correspond to, for example, a respective communication beam 202 of multiple communication beams 202 (as shown in FIGS. 2 and 3).

Although communication signals directed into (or obtained from) different access points 402 may be targeted at particular/specific coverage areas, bleedover between access points 402 can occur. For example, a downlink signal transmission for access point 402(2) can destroy an uplink signal reception for access point 402(1). Signal transmission/reception coordination logic 404 coordinates uplink and downlink signals across (e.g., between and/or among) different access points 402.

In operation, access station 102 establishes multiple co-located access points 402 using wireless I/O unit 206. Generally, signal transmission/reception coordination logic 404 coordinates uplink signal receptions and downlink signal transmissions across different access points 402 so as to avoid or at least reduce the frequency at which downlink signals are transmitted at a first access point 402($y$) while uplink signals are being received at a second access point 402($x$).

Specifically, signal transmission/reception coordination logic 404 is adapted to monitor the multiple access points 402(1 . . . N) to ascertain when a signal is being received. When an access point 402($w$) is ascertained to be receiving a signal, signal transmission/reception coordination logic 404 is capable of restraining (e.g., limiting, preventing, delaying, etc.) the transmission of signals on the other access points 402(1 . . . w−1, w+1 . . . N). It should be noted that "w" can be equal to 1 or N and that the other access points 402 reduce to access points 402(2 . . . N) and 402(1 . . . N-1), respectively.

Exemplary techniques for ascertaining whether a signal is being received and for restraining the transmission of signals are described further below. The monitoring, ascertaining, and restraining of signals can be based on and/or responsive to a myriad of factors. For example, the signals can be coordinated (e.g., analyzed and controlled) based on a per-channel basis. Such exemplary factors are also described further below.

Figure 5:
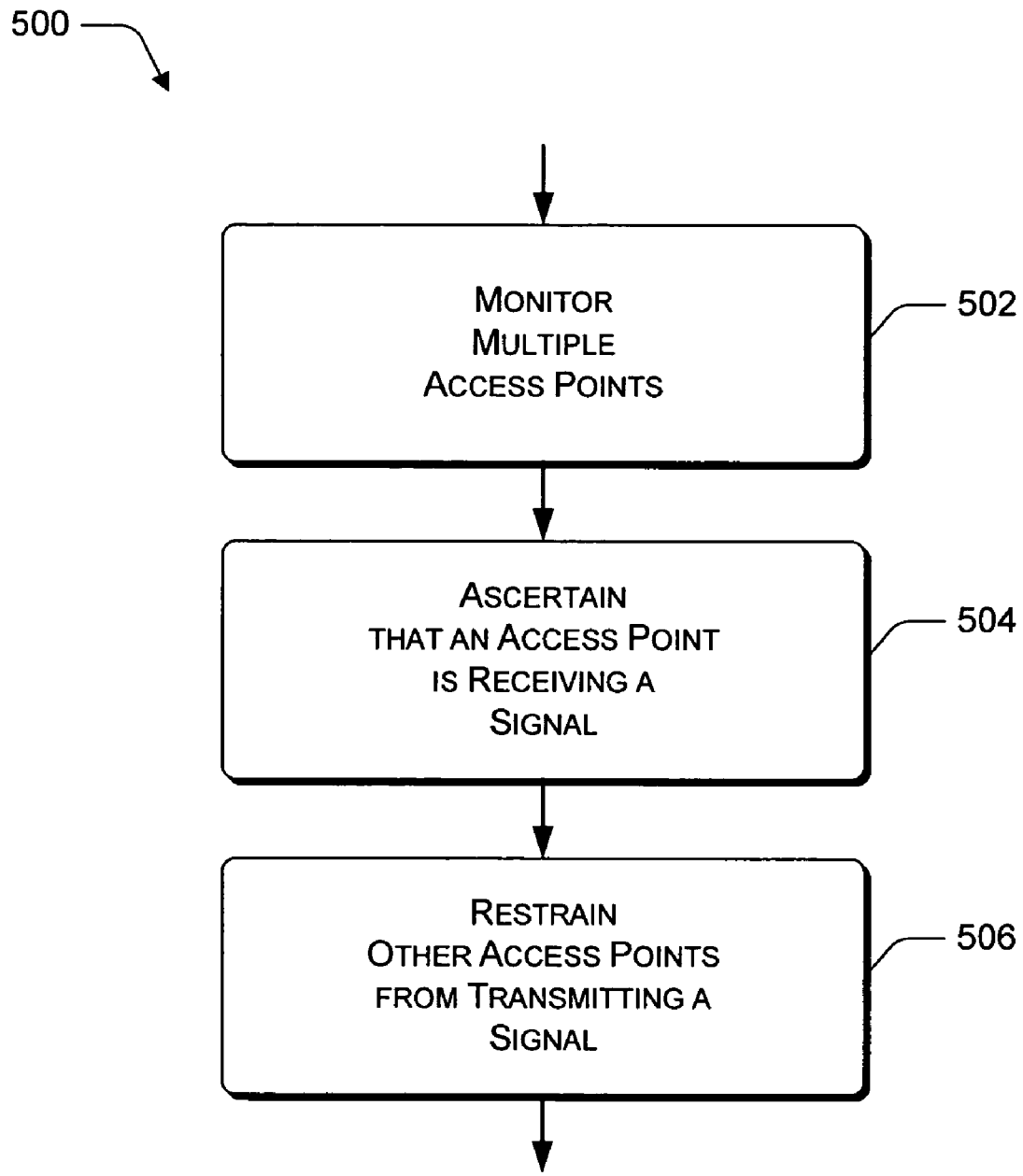
FIG. 5 is a flow diagram that illustrates an exemplary method for using an access station having signal transmission/reception coordination logic for multiple access points.

FIG. 5 is a flow diagram 500 that illustrates an exemplary method for using an access station having signal transmission/reception coordination logic for multiple access points. Flow diagram 500 includes three (3) blocks 502-506. The actions of flow diagram 500 may be performed, for example, by an access station (e.g., an access station 102 of FIG. 4).

At block 502, multiple access points are monitored. For example, access points 402(1 . . . N) may be monitored by signal transmission/reception coordination logic 404 (e.g., to detect signal reception). At block 504, it is ascertained that an access point of the multiple monitored access points is receiving a signal. For example, it may be ascertained by signal transmission/reception coordination logic 404 that an access point 402(1) of multiple access points 402(1 . . . N) is receiving a signal via a wireless I/O unit 206.

At block 506, the other access points of the multiple monitored access points are restrained from transmitting a signal. For example, signal transmission/reception coordination logic 404 may restrain access points 402(2 . . . N) from transmitting a signal. In a described implementation, signal transmission/reception coordination logic 404 may restrain access points 402(2 . . . N) from transmitting signals until access point 402(1) ceases receiving the signal.

With reference again to FIG. 4, one access point 402 (and/or communication beam 202) may operate on a different channel from that of another access point 402 (and/or communication beam 202). If the different channels are adjacent and/or not sufficiently-well defined, it may be beneficial to restrain transmission on a first channel with a first access point 402 even when receiving a wireless communication on a second different channel with a second access point 402. In another exemplary implementation for different channel situations, signal transmission/reception coordination logic 404 may restrain transmission on one channel on the basis of reception on another channel with an ongoing transmission on a third channel to prevent (e.g., inter-modulation) distortion to the signals being communicated in the wireless system.

Figure 6:
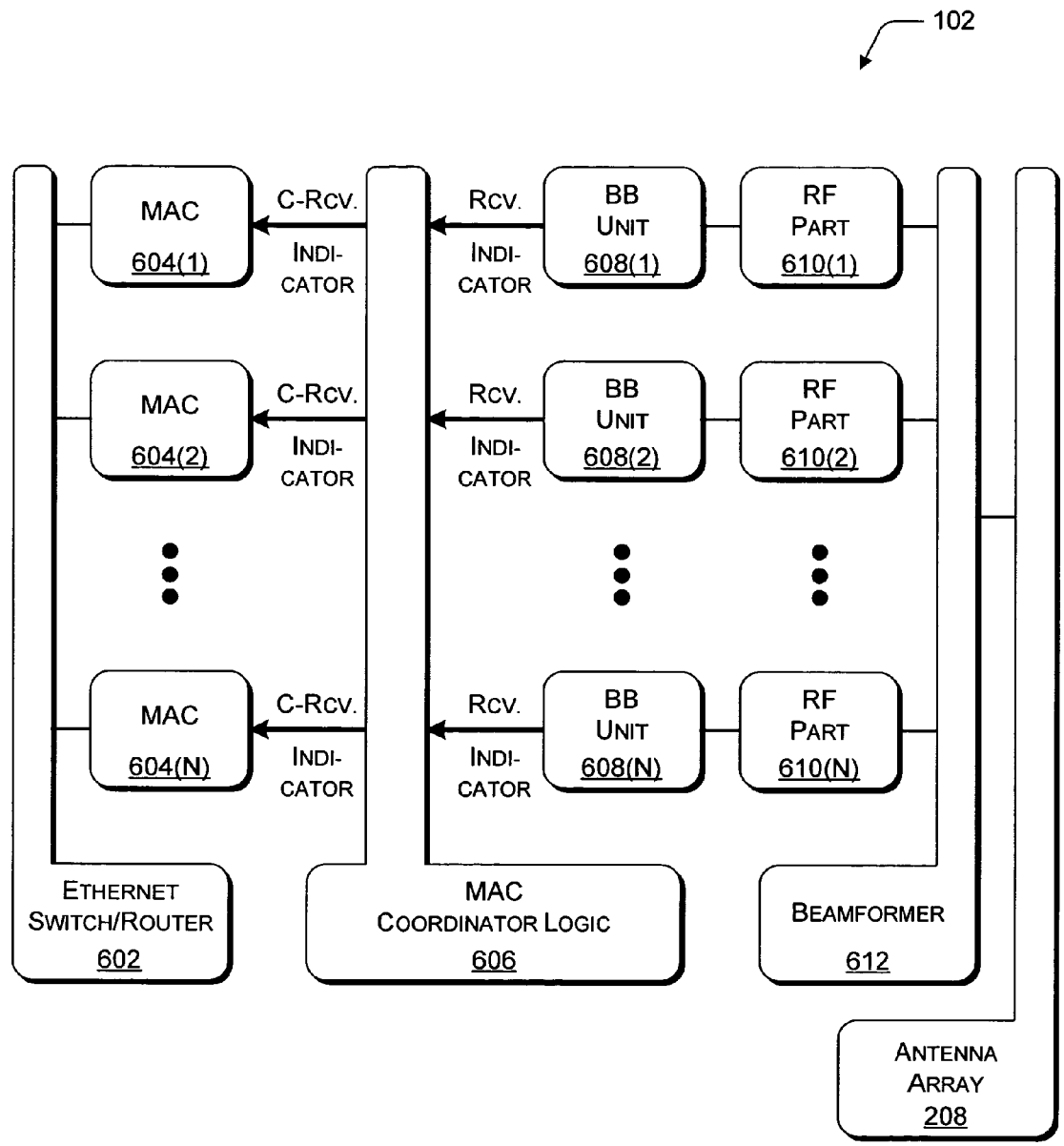
FIG. 6 illustrates an exemplary access station that includes multiple components such as medium access controllers (MACs), baseband (BB) units, and MAC coordinator logic.

FIG. 6 illustrates an exemplary access station 102 that includes multiple components such as medium access controllers (MACs) 604, baseband (BB) units 608, and MAC coordinator logic 606. As illustrated, access station 102 also includes an Ethernet switch and/or router 602, radio frequency (RF) parts 610, a beamformer 612, and antenna array 208. A wireless I/O unit 206 (e.g., as illustrated in FIGS. 2 and 4) may correspond to MACs 604, MAC coordinator logic 606, BB units 608, and RF parts 610. Such a wireless I/O unit 206 may also optionally include one or more of Ethernet switch/router 602, beamformer 612, and antenna array 208.

In a described implementation, antenna array 208 is coupled to beamformer 612. Beamformer 612 is coupled to multiple RF parts 610(1), 610(2) . . . 610(N). Respective multiple RF parts 610(1), 610(2) ... 610(N) are coupled to respective is multiple BB units 608(1), 608(2) ... 608(N). On the other hand, Ethernet switch/router 602 is coupled to multiple MACs 604(1), 604(2) ... 604(N). Both of the multiple BB units 608(1, 2 ... N) and the multiple MACs 604(1, 2 ... N) are coupled to MAC coordinator logic 606.

In operation generally, each respective MAC 604(1, 2 ... N) is associated with a respective BB unit 608(1, 2 ... N). Although not specifically shown in FIG. 6, each respective MAC 604 may also be in direct communication with each of the respective associated BB units 608. MAC coordinator logic 606 is configured to coordinate the activities of the multiple MACs 604 (e.g., as a multi-MAC controller (MMC)) with regard to at least one non-associated respective BB unit 608. For example, MAC coordinator logic 606 may forward an instruction to MAC 604(1) responsive, at least partly, to an indicator provided from BB unit 608(2). MAC coordinator logic 606 may be implemented as hardware, software, firmware, some combination thereof, and so forth.

In operation specifically, for a described implementation, Ethernet switch/router 602 is coupled to Ethernet backbone 204 (of FIG. 2). Ethernet switch/router 602 is capable of relaying incoming packets from Ethernet backbone 204 to the appropriate MAC 604 to which they correspond. Ethernet switch/router 602 is also capable of relaying outgoing packets from the multiple MACs 604 to Ethernet backbone 204. Ethernet switch/router 602 may be implemented using, for example, a general purpose central processing unit (CPU) and memory. The CPU and memory can handle layer-2 Internet protocol (IP) responsibilities, flow control, and so forth. When receiving packets from Ethernet backbone 204, Ethernet switch/router 602 looks up the destination port for the destination MAC 604 address. In this manner, an Ethernet switch and/or router 602 may be realized using software (or hardware, firmware, some combination thereof, etc.).

Antenna array 208 may be implemented as a phased array of antennas generally. Beamformer 612, in conjunction with antenna array 208, forms multiple beams such as communication beams 202 (of FIGS. 2 and 3). Beamformer 612 may be implemented as an active or passive beamformer. Examples of such active and passive beamformers include a tuned vector modulator (multiplier), a Butler matrix, a Rotman or other lens, a canonical beamformer, a lumped-element beamformer with static or variable inductors and capacitors, and so forth. Alternatively, communication beams may be formed using full adaptive beamforming.

Generally, beamformer 612 may include multiple ports for connecting to antenna array 208 and multiple ports for connecting to the multiple RF parts 610. One or more active components (e.g., a power amplifier (PA), a low-noise amplifier (LNA), etc.) may also be coupled to the multiple ports on the antenna array side of beamformer 612. Thus, antenna array 208 may be directly or indirectly coupled to beamformer 612.

Specifically, beamformer 612 may include at least "N" ports for each of the multiple RF parts 610(1, 2 ... N), but it may include more. In a described implementation, each communication beam 202 emanating from antenna array 208 corresponds to an RF part 610. Each RF part 610 may be implemented as, for example, a transmit and/or receive signal processor operating at radio frequencies. Each RF part 610 may operate at one or more frequencies, with each frequency corresponding to a different channel. It should be noted that channels may be defined alternatively (and/or additionally) using a mechanism other than frequency, such as a code, a time slot, some combination thereof, and so forth.

As described above, each respective RF part 610(1, 2 ... N) is coupled to a respective BB unit 608(1, 2 ... N). Also, each respective MAC 604(1, 2 ... N) is associated with a respective BB unit 608(1, 2 ... N). Although not so illustrated in FIG. 6 or required, each respective MAC 604 and its associated respective BB unit 608 may be located on individual respective electronic cards. The respective RF part 610 to which each respective BB unit 608 is coupled may also be located on the individual respective electronic cards. In a described implementation, each respective MAC 604 and its associated respective BB unit 608 may be associated with a different respective access point, such as access points 402(1, 2 ... N) (of FIG. 4). Each respective RF part 610, along with at least part of beamformer 612 and/or antenna array 208, and each respective communication beam 202 may also correspond to the different respective access points 402.

MACs 604 are adapted to control access to the media that is provided, at least partially, by BB units 608. In this case, the media corresponds to the signals transmitted and/or received via communication beams 202 (of FIGS. 2 and 3). These signals may be analog, digital, and so forth. In a described implementation, such digital signals comprise one or more packets.

In a packet-based environment, a packet arriving at access station 102 via a particular communication beam 202($w$) from a particular remote client 104($w$) (of FIGS. 1 and 2) is received using beamformer 612 and antenna array 208. The packet is processed using a particular RF part 610($w$) and a particular corresponding BB unit 608($w$). The packet is then forwarded from BB unit 608($w$) to a particular associated MAC 604($w$), which permits the packet to be placed on Ethernet backbone 204 (of FIG. 2) by Ethernet switch/router 602. Packets arriving at access station 102 via Ethernet switch/router 602 are eventually transmitted to remote client 104($w$) via communication beam 202($w$) in an oppositely traversed path.

The transmission and reception of packets via communication beams 202, as well as the forwarding of packets within access station 102, may be controlled at least partially by MACs 604. It should be noted that a packet may actually be received by more than one communication beam 202 and BB unit 608/MAC 604 pair. Based on the destination address, one MAC 604 selects the packet and the other MACs 604 discard it.

In a typical MAC-baseband environment, a MAC controls its associated baseband circuitry using input solely from its associated baseband circuitry. For example, if baseband circuitry indicates to its associated MAC that it is receiving a packet, then the associated MAC does not ask the baseband circuitry to transmit a packet, which can jeopardize the integrity of the packet being received.

With (i) co-located access points 402 (e.g., as in FIG. 4) and/or (ii) co-located pairs of MACs 604 and associated BB units 608, (i) a given first access point 402($x$) and/or (ii) a given first MAC 604($x$)/BB unit 608($x$) pair are (possibly) unaware of the condition or state (e.g., transmitting, receiving, idle, etc.) of (i) a second access point 402($y$) and/or (ii) a second MAC 604($y$)/BB unit 608($y$) pair, and vice versa. As a result, absent additional control/logic, a packet being received by (i) the given first access point 402($x$) and/or (ii) the given first MAC 604($x$)/BB unit 608($x$) pair can be thrashed (e.g., altered, destroyed, interfered with, rendered unusable for its intended purpose, etc.) by a transmission from (i) the second access point 402($y$) and/or (ii) the second MAC 604($y$)/BB unit 608($y$) pair.

This thrashing may occur even though the packet reception and the packet transmission are effectuated using different communication beams 202(x) and 202(y), respectively, when the reception and transmission occur on the same channel (or adjacent or otherwise sufficiently proximate channels with imprecise channel boundaries). In other words, an incoming packet reception via a communication beam 202(x) can be rendered unsuccessful by an outgoing packet transmission via a communication beam 202(y) that occurs on the same channel (or adjacent or otherwise sufficiently proximate channels with imprecise channel boundaries) and is temporally overlapping.

As described above, MAC coordinator logic 606 is coupled to both of multiple BB units 608(1, 2 ... N) and multiple MACs 604(1, 2 ... N). In a described implementation, MAC coordinator logic 606 is configured to prevent MACs 604(1, 2 ... N) from causing a transmission if at least one and optionally if any of BB units 608(1, 2 ... N) are receiving. For example, if BB unit 608(2) indicates that it is receiving a packet, MAC coordinator logic 606 instructs MACs 604(1, 2 ... N) so as to restrain them from causing a packet transmission during the packet reception. Factors that can modify, tune, tweak, extend, etc. this packet transmission restraint are provided further below. As an example, the MACs of MACs 604(1, 3 ... N) that enable transmissions on a different channel or channels from that of BB unit 608(2) may not be restrained.

More specifically, each BB unit of BB units 608(1, 2 ... N) forwards a receive indicator ("Rcv. Indicator" in FIG. 6) to MAC coordinator logic 606. MAC coordinator logic 606 is thus able to monitor BB units 608(1, 2 ... N). MAC coordinator logic 606 analyzes the receive indicators to produce a constructive receive indicator ("C-Rcv. Indicator" in FIG. 6). This constructive receive indicator is provided to each MAC of MACs 604(1, 2 ... N).

In a described implementation, each BB unit 608(z) of BB units 608(1, 2 ... N) forwards a receive indicator that reflects whether/when BB unit 608(z) is currently receiving a signal. Optionally, not physically forwarding an indicator may constitute a receive indicator that reflects that no signal is being received. After processing the different receive indicators, MAC coordinator logic 606 forwards the same constructive receive indicator to each MAC of MACs 604(1, 2 ... N) based on multiple, and possibly all, receive indicators. As alluded to above, employing different factors, for example, may result in MAC coordinator logic 606 providing different constructive receive indicators to at least different subsets of MACs of MACs 604(1, 2 ... N).

The receive indicators forwarded to MAC coordinator logic 606 from BB units 608(1, 2 ... N) may be comprised of any one or more different indications from BB units 608(1, 2 ... N). For example, the receive indicators may comprise clear channel assessment (CCA) or busy/non-busy indications. Alternatively, the receive indicators may comprise indications of signal reception based on energy signals, cross-correlation signals, data signals, other transmit and/or control signals, some combination thereof, and so forth. Furthermore, a receive indicator may comprise an analog or digital indication (of one or more bits), the driving of one or more lines, the presentation of one or more messages, some combination thereof, and so forth.

In a described implementation, MAC coordinator logic 606 accepts the receive indicators from BB units 608(1, 2 ... N) and combines them in some manner to produce the constructive receive indicator(s). For example, MAC coordinator logic 606 may "OR" the receive indicators together to produce the constructive receive indicator. Consequently, if any receive indicator from BB units 608(1, 2 ... N) indicates that a BB unit is receiving a signal, then the constructive receive indicator indicates to each MAC of MACs 604(1, 2 ... N) that a reception is occurring on some communication beam 202 (and/or access point 402) of access station 102. As a result, the MACs of MACs 604(1, 2 ... N) that are provided such an affirmative constructive receive indicator do not cause their respective associated BB units of BB units 608(1, 2 ... N) to transmit. The constructive receive indicators provided from MAC coordinator logic 606 to MACs 604(1, 2 ... N) may be comprised of any one or more different indications interpretable by MACs 604(1, 2 ... N). For example, the constructive receive indicators may comprise an indication for one or more predetermined inputs, such as a CCA or busy/non-busy input, of MACs 604(1, 2 ... N). Alternatively, the constructive receive indicators may be input to a different type of do-not-transmit input, a specially-designed input, a message-capable input, some combination thereof, and so forth. Furthermore, a constructive receive indicator may comprise an analog or digital indication (of one or more bits), the driving of one or more lines, the presentation of one or more messages, some combination thereof, and so forth.

Figure 7:
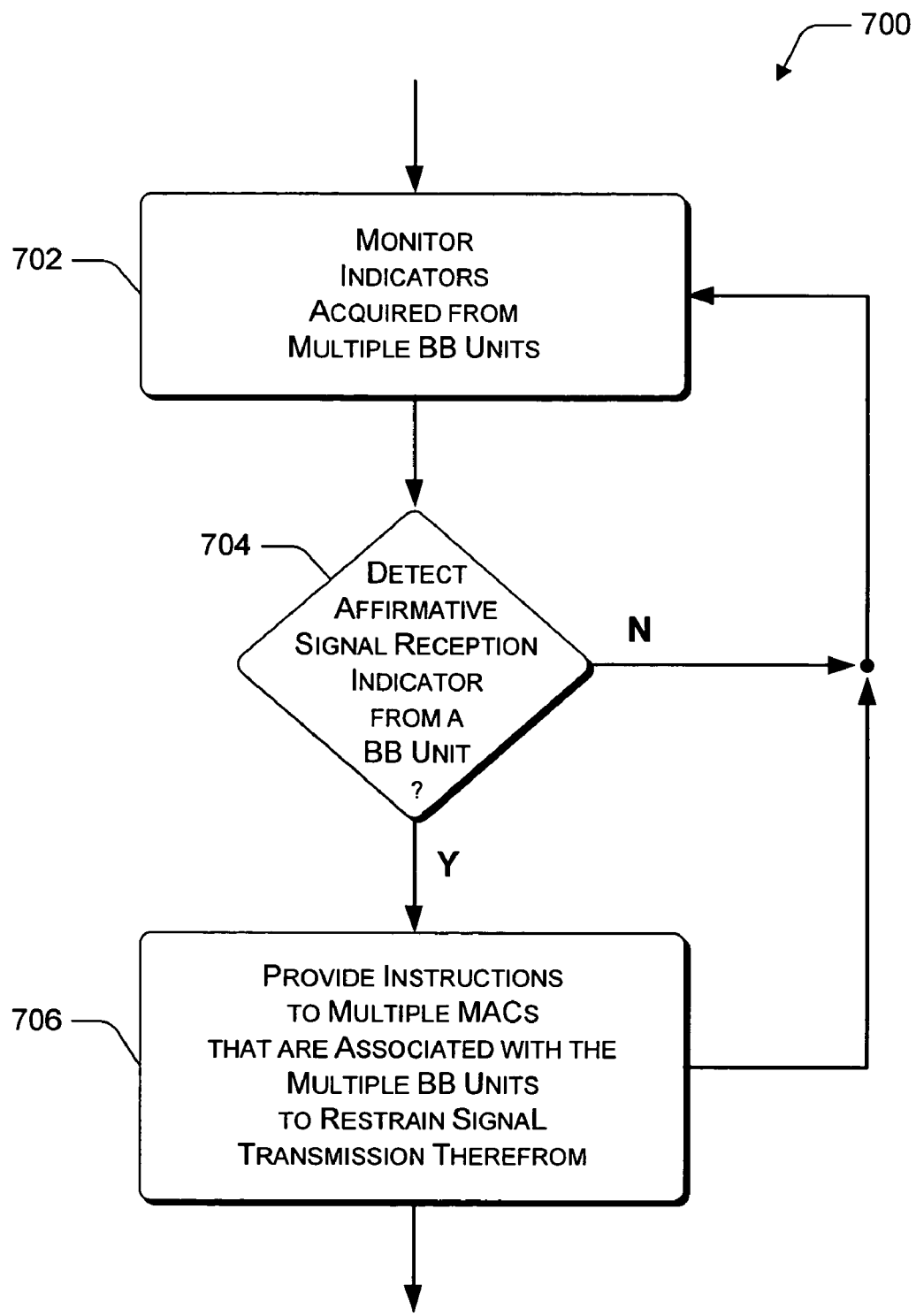
FIG. 7 is a flow diagram that illustrates an exemplary method for using MAC coordinator logic with multiple MACs and associated multiple BB units.

FIG. 7 is a flow diagram 700 that illustrates an exemplary method for using MAC coordinator logic with multiple MACs and associated multiple BB units. Flow diagram 700 includes three (3) blocks 702-706. The actions of flow diagram 700 may be performed, for example, by MAC coordination logic of an access station (e.g., by MAC coordinator logic 606 of access station 102 of FIG. 6).

At block 702, indicators acquired from multiple BB units are monitored. For example, multiple receive indicators that are accepted at MAC coordinator logic 606 from multiple BB units 608(1, 2 ... N) are monitored. At block 704, it is determined whether an affirmative signal reception indicator from a BB unit is detected. For example, of the multiple receive indicators accepted at MAC coordinator logic 606, MAC coordinator logic 606 determines whether at least one receive indicator is detected to indicate that the originating BB unit(s) 608 is(are) receiving a signal. As described above, if a MAC 604 and associated BB unit 608 transmit a signal on the same channel as that of a signal being received (e.g., by a different MAC 604/BB unit 608 pair) during that signal reception, the signal being received may be thrashed.

If no indicator is determined to affirmatively indicate that a signal is being received (at block 704), the monitoring (of block 702) is continued. For example, as long as MAC coordinator logic 606 fails to detect a signal reception via the receive indicators, MAC coordinator logic 606 continues to monitor the receive indicators from BB units 608(1, 2 ... N). If, on the other hand, an affirmative signal reception indicator from a BB unit has been detected (at block 704), then at block 706 instruction(s) are provided to multiple MACs that are associated with the multiple BB units to restrain signal transmission therefrom. For example, if MAC coordinator logic 606 detects (e.g., through a logical "OR" operation) that at least one receive indicator indicates that a signal reception is occurring, then MAC coordinator logic 606 provides a constructive receive indicator to MACs 604(1, 2 N) that affirmatively indicates a signal reception is occurring in order to restrain them from initiating or otherwise causing a signal transmission.

Figure 8:
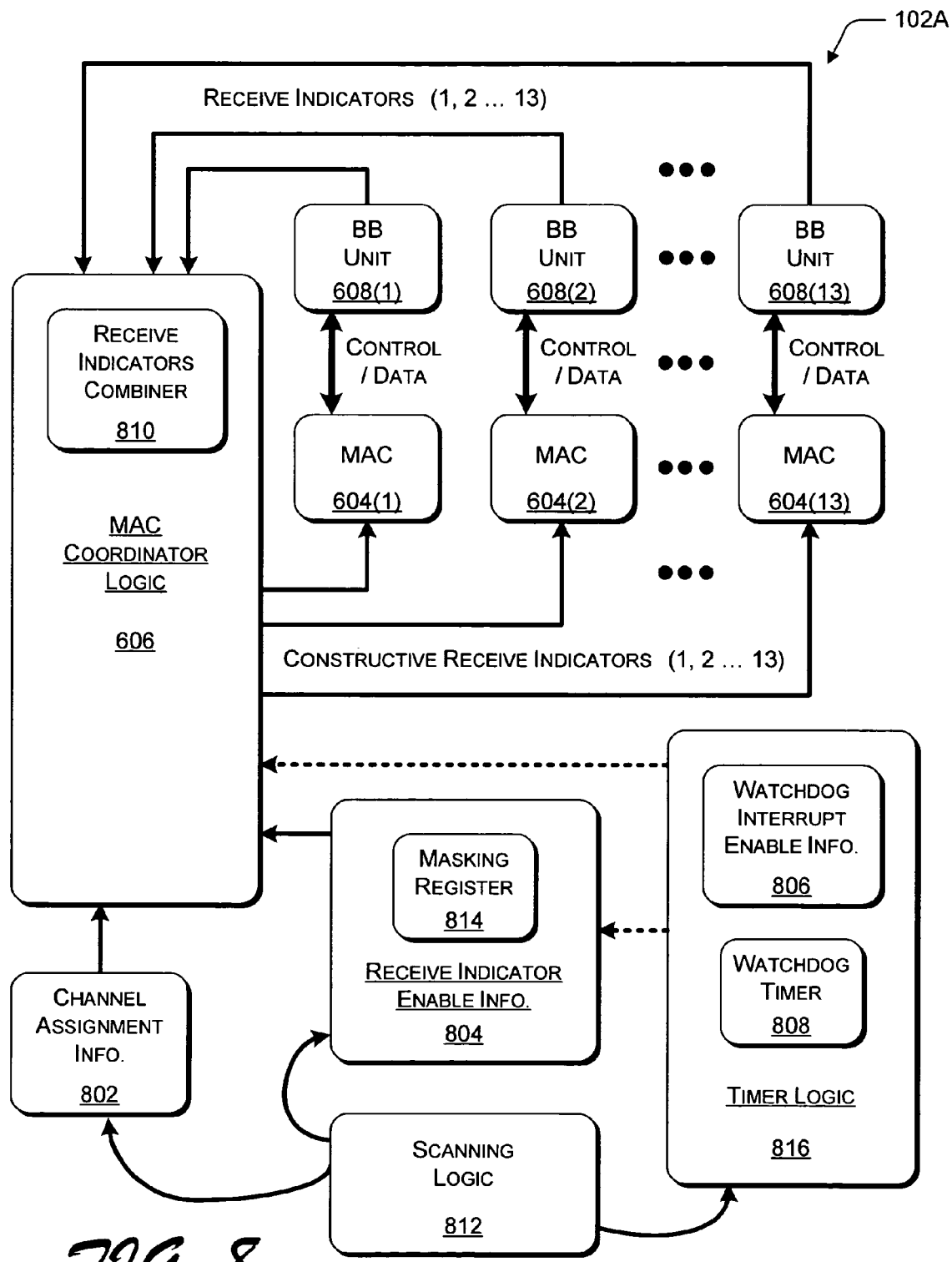
FIG. 8 illustrates another exemplary access station that includes multiple components such as MACs, BB units, and MAC coordinator logic.

FIG. 8 illustrates another exemplary access station 102A that includes multiple components such as MACs 604, BB units 608, and MAC coordinator logic 606. Exemplary access station 102A includes thirteen MACs 604(1, 2 ... 13) and thirteen BB units 608(1, 2 ... 13) that are associated respectively therewith. Thirteen BB units 608(1, 2 ... 13) and thirteen MACs 604(1, 2 ... 13) are utilized in access station 102A to comport with the efficiently usable communication beams 202(0 . . . 6) and 202(10 . . . 15) of the exemplary set of communication beams of FIG. 3.

However, the elements of FIG. 8 and the description thereof is applicable to access stations 102 with more than or fewer than thirteen MACs 604 and BB units 608. Also, although not so illustrated, exemplary access station 102A may include other optional aspects of an access station (e.g., those aspects illustrated in FIG. 6 for access station 102).

As illustrated, BB units 608(1, 2 . . . 13) are capable of communicating with MACs 604(1, 2 . . . 13), and vice versa, directly or indirectly without using MAC coordinator logic 606. Specifically, control and/or data may be transferred therebetween. Such control/data information may include, for example, data packets for wireless communication on communication beams 202 (of FIGS. 2 and 3), carrier sense multiple access/collision avoidance (CSMA/CA) type information, and so forth.

In a described implementation, BB units 608(1, 2 . . . 13) forward receive indicators (1, 2 . . . 13) to MAC coordinator logic 606. MAC coordinator logic 606 includes receive indicators combiner 810. Receive indicators combiner 810 may be comprised of one or more of program coding, a field-programmable gate array, discrete logic gates, and so forth. In other words, receive indicators combiner 810 may be comprised of hardware, software, firmware, some combination thereof, and so forth.

Receive indicators combiner 810 combines receive indicators (1, 2 . . . 13) in some manner to produce constructive receive indicators (1, 2 . . . 13). For example, receive indicators (1, 2 . . . 13) may be combined using some coordination functionality, such as a logical "OR" functionality. In a described implementation, such logical "OR" functionality ensures that if any one or more receive indicators of receive indicators (1, 2 . . . 13) is indicating that a signal is being received, then the associated constructive receive indicators of constructive receive indicators (1, 2 . . . 13) also indicate that a signal is being received.

These constructive receive indicators (1, 2 . . . 13) are provided to MACs 604(1, 2 . . . 13), respectively, so that MACs 604(1, 2 . . . 13) do not cause BB units 608(1, 2 . . . 13) to transmit a signal while another signal is being received. As described further below, the BB units of BB units 608(1, 2 . . . 13) and the MACs of MACs 604(1, 2 . . . 13) may be segmented or grouped by a characteristic and/or state, such as by wireless communications channel. When segmented or grouped, a constructive receive indicator of a given segment or group indicates to a MAC that a signal is being received and that no signal should therefore be transmitted when any receive indicator of that given segment or group indicates that a signal is being received (or when multiple receive indicators of that given segment or group indicate that multiple signals are being received).

As noted above, MAC coordinator logic 606 (and signal transmission/reception coordination logic 404 (of FIG. 4)) may be modified, tweaked, expanded, etc. based on any one or more of many factors. FIG. 8 illustrates some of these factors. For example, FIG. 8 includes channel assignment information 802, receive indicator enable information 804, timer logic 816, and scanning logic 812. Channel assignment information 802, receive indicator enable information 804, timer logic 816, and/or scanning logic 812 may be part of MAC coordinator logic 606 or another part of access station 102A.

Channel assignment information 802 enables receive indicators (1, 2 . . . 13) to be combined by receive indicators combiner 810 on a per-channel basis. As a result, constructive receive indicators (1, 2 . . . 13) restrain signal transmissions from MAC 604/BB unit 608 pairs when a signal reception is occurring on the same channel, even if by a different MAC 604/BB unit 608 pair. A downlinked packet that is transmitted on one channel while an uplinked packet is being received on another channel does not usually cause the uplinked packet to be thrashed (as long as the two channels are sufficiently well-defined or otherwise separated). On the other hand, a downlinked packet that is transmitted on a channel while an uplinked packet is being received on the same channel does usually cause the uplinked packet to be thrashed, even if the transmission and reception occur using different communication beams 202 (of FIGS. 2 and 3).

Channel assignment information 802 may be implemented as, for example, a vector that relates each MAC 604 and associated BB unit 608 to one of two or more channels. Hence, prior to combination using receive indicators combiner 810, each respective receive indicator of receive indicators (1, 2 . . . 13) can be mapped to a channel segmentation or grouping based on a wireless communication channel used by a corresponding MAC 604/BB unit 608 pair.

Receive indicator enable information 804 provides information for receive indicators combiner 810 that stipulates which receive indicators of receive indicators (1, 2 . . . 13) are to be used in a combination operation to produce the constructive receive indicators of constructive receive indicators (1, 2 . . . 13). Thus, certain receive indicators may be excluded from the combination operation for one or more reasons. For example, a grouping can be arbitrary, can be based on the presence of an overlapping subnet, etc.; each group may therefore be treated differently by or for a coordination function. Exemplary combination groupings and reasons for exclusion are described further below. Using receive indicator enable information 804 reduces the likelihood that external channel activity can prevent all transmissions from access station 102.

Receive indicator enable information 804 may be implemented as, for example, a masking register 814 that comprises a register with exclusionary bits for masking one or more receive indicators of receive indicators (1, 2 . . . 13) from a combination operation of receive indicators combiner 810. In a described implementation, masking register 814 includes thirteen bits that correspond to the thirteen receive indicators (1, 2 . . . 13), which correspond to the thirteen BB units 608(1, 2 . . . 13).

Timer logic 816 may be used for one or two (or more) factors. Although only shown once, timer logic 816 may alternatively be implemented multiple times in exemplary access station 102A to account for multiple factors, or one implementation may be capable of handling multiple timer functions. Timer logic 816 includes watchdog timer 808 and optionally watchdog interrupt enable information 806.

For a first factor, timer logic 816 relates to individual receive indicators (1, 2 . . . 13). A duration of watchdog timer 808 is set equal to a maximum packet duration (e.g., a maximum-allowed length of a packet). Watchdog timer 808 is started when a particular receive indicator begins indicating that a signal is being received and stopped when the particular receive indicator ceases indicating that the signal is being received. If watchdog timer 808 is not tolled by an indication of signal reception cessation prior to its expiration, then the signal being received is likely to not be intended for access station 102A. In this case, timer logic 816 may indicate that the BB unit 608 corresponding to the particular receive indicator is not to be used in a combination operation.

This combination operation exclusion indication may be effectuated using receive indicator enable information 804

(e.g., by setting a bit in masking register 814). This exclusion may last for a predetermined duration, which may be, for example, a system parameter that is individually configured for a given deployment. It should be noted that expiration of watchdog timer 808 may also occur in other situations. For example, it may also occur when a packet is involved in a collision with one or more temporally overlapping packets, when there is a large interferer emanating an appropriate signal for a sufficiently long duration, and so forth.

For a second factor, timer logic 816 relates to constructive receive indicators (1, 2 . . . 13) on a per-channel basis. A duration of watchdog timer 808 is set with consideration of a temporal threshold beyond which a problem or error should be contemplated to have occurred and hence investigated. Watchdog timer 808 is started when a particular constructive receive indicator (or indicators) for a given channel begins indicating that a signal is being received on the given channel and stopped when the particular constructive receive indicator ceases indicating that the signal is being received on the given channel. If watchdog timer 808 is not tolled by an indication of signal reception cessation prior to its expiration, then there is a likelihood that an error has occurred.

Watchdog interrupt enable information 806 is used for this second factor, and it stipulates which channel(s) (and thus which constructive receive indicators) are enabled for interruption. If watchdog timer 808 expires and the given channel is enabled in accordance with watchdog interrupt enable information 806, an interrupt is generated and provided to MAC coordinator logic 606 or another component of access station 102A. MAC coordinator logic 606 or the other component is then charged with investigating the ongoing affirmative constructive receive indicator and/or of notifying a user/operator to do so.

Scanning logic 812 may act independently or interactively with any one or more of channel assignment information 802, receive indicator enable information 804, and timer logic 816. For example, scanning logic 816 may scan across communication beams 202 using different channels on receive to detect which channel or channels have the least or lowest interference levels. This scanning may occur once, periodically, continuously, and so forth. A channel assignment vector or similar for channel assignment information 802 may be configured responsive to such scanning and interference determinations of scanning logic 812.

As another example, scanning logic 812 may scan across communication beams 202 to detect the presence of other access points (e.g., non-co-located access points) that are causing interference on a regular or constant basis. The existence of an access point may be inferred by receiving a basic service set identifier (BSSID) being broadcast by another access point. When another access point is detected within a coverage area of a particular communication beam 202 (e.g., when an overlapping subnet is detected), scanning logic 812 may interact with receive indicator enable information 804 to mask out a corresponding receive indicator from a BB unit 608 that corresponds to the particular communication beam 202. As a result, frequent receptions from the overlapping subnet (e.g., another access station having an overlapping coverage area) do not constantly prevent BB unit 608/MAC 604 pairs on the same channel from transmitting. Such a configuration or feature may be enabled by observing long term statistics of overlapping subnet traffic, through explicit communication between different various subnets or their network management entities, and so forth.

In an exemplary implementation, access station 102A may be configured as follows: The receive indicators (1, 2 . . . 13) correspond to the state of the CCA output as detected by BB units 608(1, 2 . . . 13), and constructive receive indicators (1, 2 . . . 13) correspond to the state of the CCA input to MACs 604(1, 2 . . . 13). Based on the values for receive indicators (1, 2 . . . 13), channel assignment information 802, and receive indicator enable information 804, MAC coordinator logic 606 determines the constructive receive indicators (1, 2 . . . 13) for each RF part 610 (of FIG. 6) (as provided via MACs 604, BB units 608, etc).

Continuing with this exemplary implementation, MAC coordinator logic 606 operates as follows:
- An indicator "channel_wide_busy" for each channel is defined, where channel_wide_busy is affirmative (e.g., active) if:
  - the receive indicator from any BB units operating on that channel indicates that a signal is being received, excluding those BB units whose receive indicator enable information is not set (e.g., in masking register 814).
- MAC coordinator logic 606 sets the constructive receive indicator for a particular MAC 604/BB unit 608 pair to affirmative (e.g., busy) if:
  - the receive indicator for that BB unit 608 indicates affirmative (e.g., busy); or
  - channel_wide_busy for the channel of this particular MAC 604/BB unit 608 pair is affirmative (e.g., active).

Figure 9:
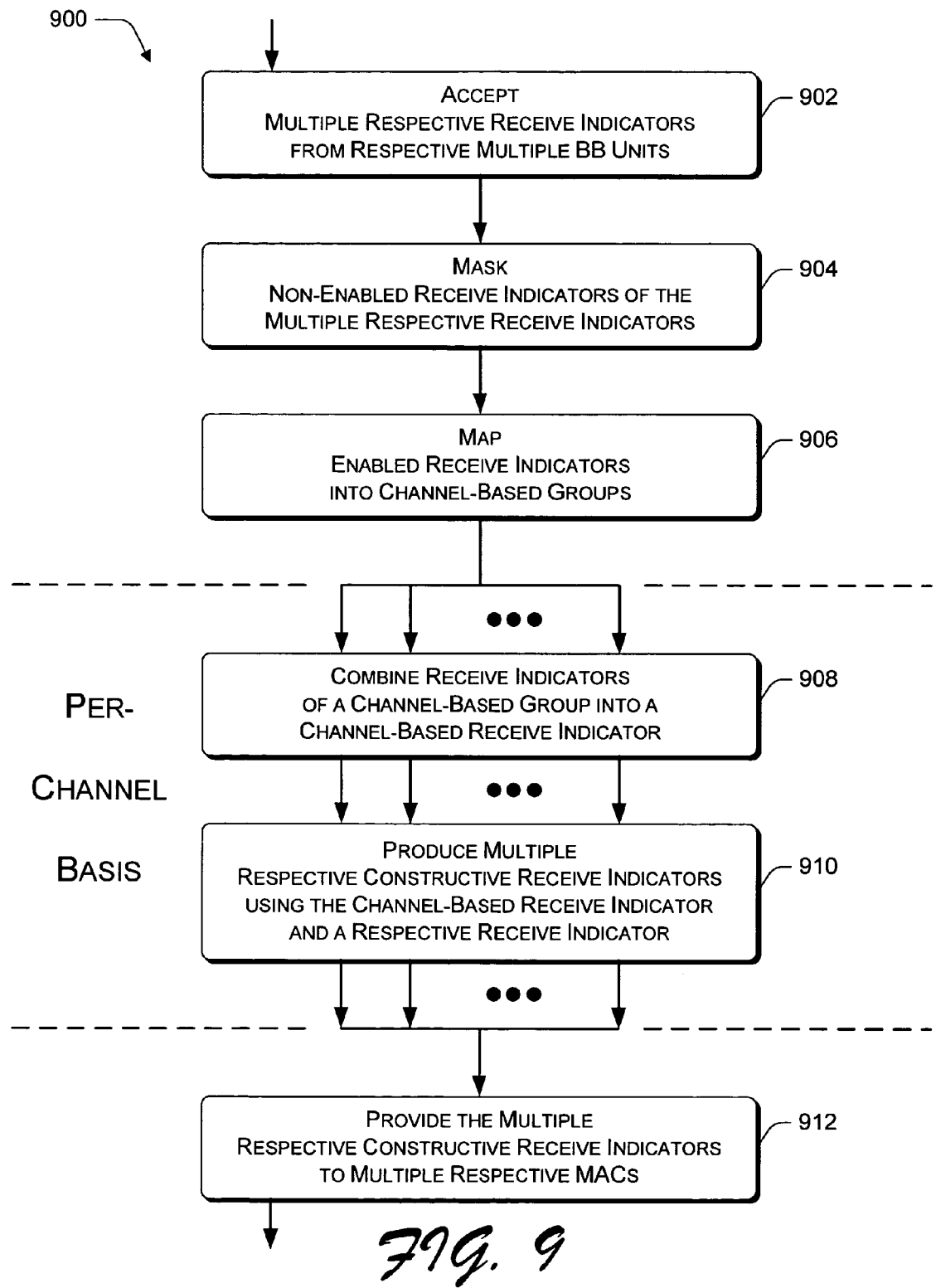
FIG. 9 is a flow diagram that illustrates another exemplary method for using MAC coordinator logic with multiple MACs and associated multiple BB units.

FIG. 9 is a flow diagram 900 that illustrates another exemplary method for using MAC coordinator logic with multiple MACs and associated multiple BB units. Flow diagram 900 includes six (6) blocks 902-912. The actions of flow diagram 900 may be performed, for example, by MAC coordination logic of an access station (e.g., by MAC coordinator logic 606 of access station 102A of FIG. 8).

At block 902, multiple respective receive indicators are accepted from respective multiple BB units. For example, receive indicators (1, 2 . . . 13) may be accepted from BB units 608(1, 2 . . . 13) at MAC coordinator logic 606. At block 904, non-enabled receive indicators of the multiple respective receive indicators are masked. For example, one or more of receive indicators (1, 2 . . . 13) may be masked in accordance with receive indicator enable information 804 using masking register 814. The non-masked receive indicators are therefore enabled receive indicators.

At block 906, enabled receive indicators are mapped into channel-based groups. For example, those receive indicators of receive indicators (1, 2 . . . 13) that are not masked out by masking register 814, may be segmented by channel in accordance with channel assignment information 802. It should be noted that the actions of blocks 904 and 906 in particular may be performed sequentially or partially, substantially, or completely simultaneously with each other. Once the enabled receive indicators are grouped, production of constructive receive indicators may be effectuated by group on a per-channel basis. Thus, as shown in FIG. 9, the actions of blocks 908 and 910 may be performed for as many groups (e.g., two or more) as there are channels.

At block 908, receive indicators of a channel-based group are combined into a channel-based receive indicator. For example, receive indicators of receive indicators (1, 2 . . . 13) that are enabled and that correspond to a single channel may be logically "ORed" together. At block 910, multiple respective constructive receive indicators are produced using the channel-based receive indicator and a respective receive indicator. For example, for each of multiple MAC 604/BB unit 608 pairs, a respective constructive receive indicator of constructive receive indicators (1, 2 . . . 13) is produced responsive to the corresponding respective receive indicator of receive indicators (1, 2 . . . 13) and the channel-based receive indicator.

Thus, each respective constructive receive indicator of constructive receive indicators (1, 2 . . . 13) affirmatively indicates that a signal is being received to MACs 604(1, 2 . . . 13) if an associated respective BB unit 608(1, 2 . . . 13) forwards an affirmative receive indicator (1, 2 . . . 13) or any respective BB unit 608(1, 2 . . . 13) mapped to the same channel forwards an affirmative receive indicator (1, 2 . . . 13). The actions of blocks 908 and 910 for each channel-based group may be performed sequentially or partially, substantially, or completely simultaneously with each other.

At block 912, the multiple respective constructive receive indicators are provided to multiple respective MACs. For example, constructive receive indicators (1, 2 . . . 13) may be provided to MACs 604(1, 2 . . . 13) from MAC coordinator logic 606. As indicated by the initial and final flow arrows in flow diagram 900 (as well as those of flow diagrams 500 and 700 of FIGS. 5 and 7, respectively), the illustrated methods may repeat, continue, be part of a larger method, some combination thereof, and so forth.

Figure 10:
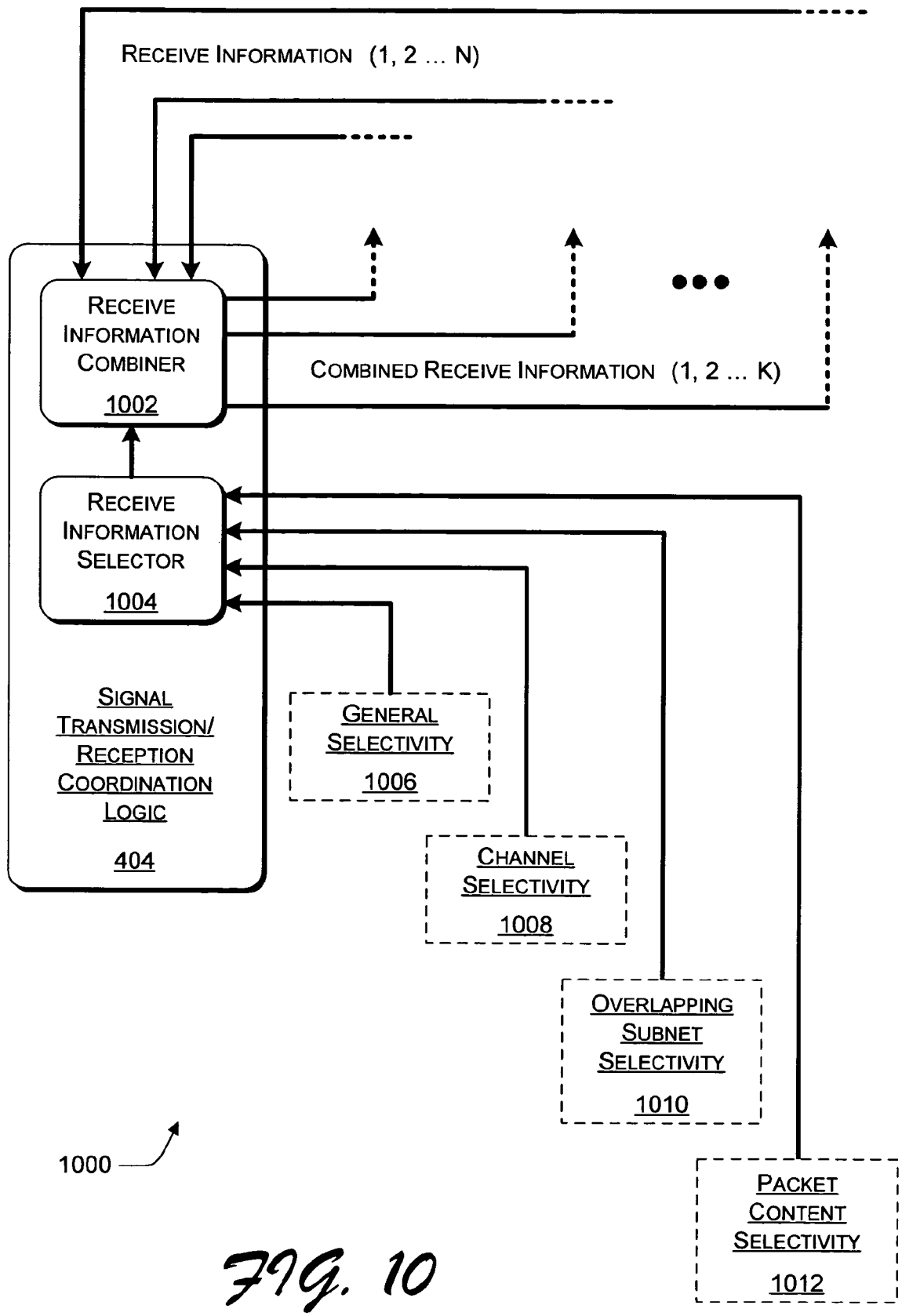
FIG. 10 illustrates an exemplary implementation of and environment for signal transmission/reception coordination logic.

FIG. 10 illustrates an exemplary implementation of and environment 1000 for signal transmission/reception coordination logic 404. Signal transmission/reception coordination logic 404 accepts as inputs receive information (1, 2 . . . N) and produces as outputs combined receive information (1, 2 . . . K). The number "N" of receive information inputs may not equal the number "K" of combined receive information outputs.

In a described implementation, signal transmission/reception coordination logic 404 includes receive information combiner 1002 and receive information selector 1004. Receive information combiner 1002 applies a signal coordination function to the receive information (1, 2 . . . N) to produce the combined receive information (1, 2 . . . K). The combined receive information (1, 2 . . . K) may be utilized to ascertain signal reception and restrain signal transmission.

The combined receive information (1, 2 . . . K) may optionally be produced with regard to receive information selector 1004. Receive information selector 1004 enables a selectivity to be applied to the combining of the receive information (1, 2 . . . N). Factors controlling this receive information selectivity are generally represented by general selectivity 1006. Receive information selector 1004 instructs receive information combiner 1002 as to what receive information (1, 2 . . . N) is to be combined or excluded and into which groups or segments.

In a more-specific implementation with reference to FIGS. 6 and 8, signal transmission/reception coordination logic 404 may be realized as MAC coordinator logic 606. Thus, receive information (1, 2 . . . N) may correspond to receive indicators (1, 2 . . . 13), and combined receive information (1, 2 . . . K) may correspond to constructive receive indicators (1, 2 . . . 13). Similarly, the functionality describe herein above with reference to channel assignment information 802, receive indicator enable information 804/masking register 814, scanning logic 812, etc. is exemplary receive information selectivity control for receive information selector 1004.

Continuing with FIG. 10, another control factor for receive information selector 1004 is provided by channel selectivity 1008. Channel selectivity 1008, via receive information selector 1004, enables receive information combiner 1002 to selectively combine respective receive information (1, 2 . . . N) according to respective channel groups.

Another control factor for receive information selector 1004 is provided by overlapping subnet selectivity 1010. Receptions from other (undesired) access stations/subnets are identified so that they may be disregarded. Specifically, if a communication beam of a given access station is receiving a signal from another (undesired) access station/subnet, then the receive information corresponding to that communication beam is de-selected by receive information selector 1004 at receive information combiner 1002 for the relevant coordination function so as not to affect the combined receive information (1, 2 . . . K). Consequently, transmissions at a given access station are not restrained by signals that are received thereat from other access stations/overlapping subnets.

Still yet another control factor for receive information selector 1004 is provided by packet content selectivity 1012. The content of one or more received packets are used to select which and/or how receive information (1, 2 . . . N) is combined by receive information combiner 1002. For example, a destination address (e.g., a MAC address) of the received packet is compared to a destination address (e.g., for a singular access point) or a set of destination addresses (e.g., for multiple co-located access points) of the receiving access point.

If the destination address of the received packet is equivalent to (one of) the destination address(es) of the receiving access point (access station), then the receive information for the received packet is selected for inclusion/consideration by receive information selector 1004 at receive information combiner 1002. If not, then the receive information for the received packet is excluded for consideration by receive information selector 1004 at receive information combiner 1002. More generally for signal transmission/reception coordination logic 404, a coordination function may be applied to signal communication information in order to produce combined signal communication information that is utilized to coordinate signal transmission and reception. It should be noted that the destination address may be compared for an equivalency determination after a portion of the packet has been received but before the entirety of the packet has been received (i.e., before reception is complete).

Figure 11:
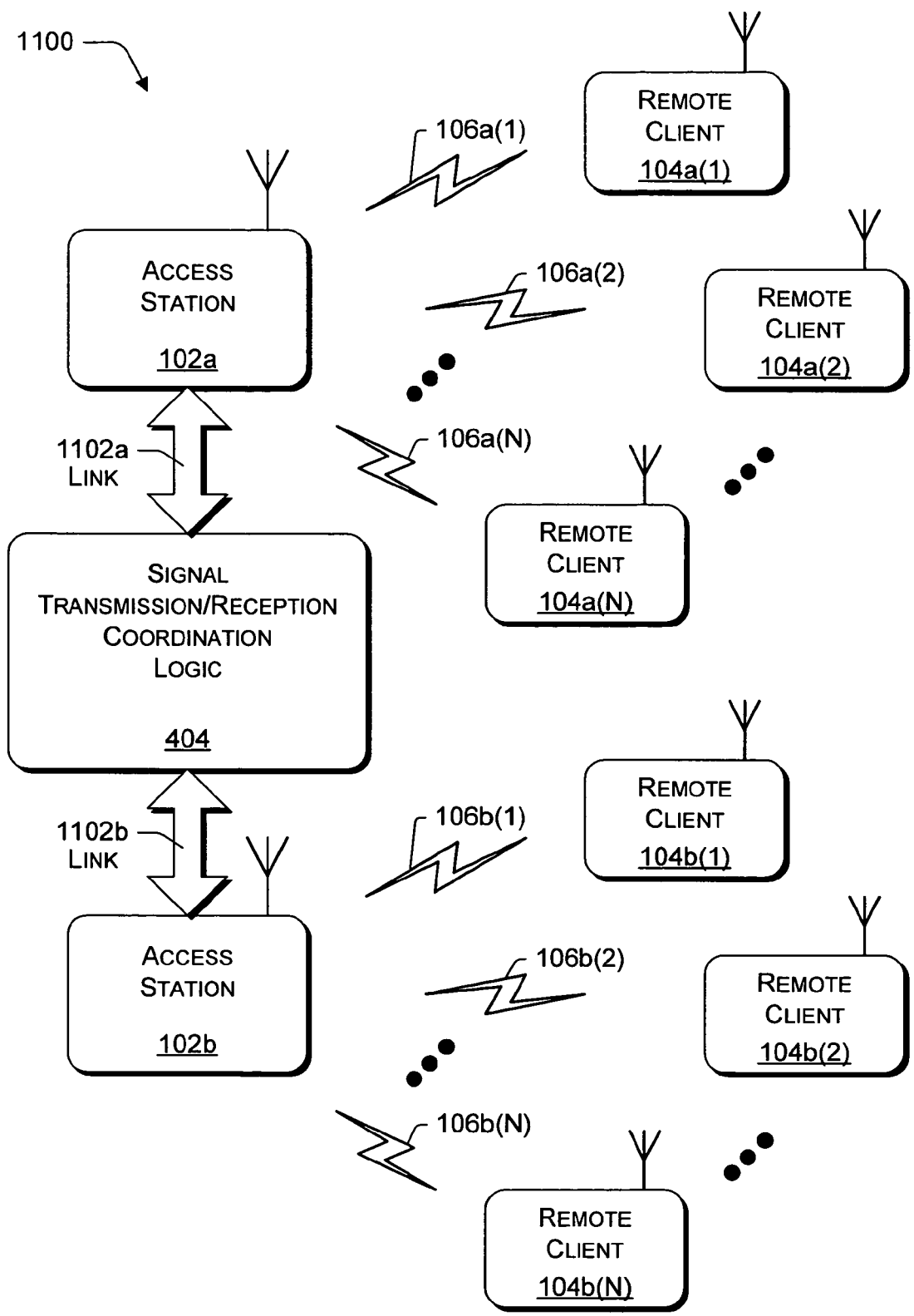
FIG. 11 illustrates a first exemplary multiple access station environment that includes signal transmission/reception coordination logic.

FIG. 11 illustrates a first exemplary multiple access station environment 1100 that includes signal transmission/reception coordination logic 404. Multiple access station environment 1100 includes two or more access stations 102. Each access station 102 may be in wireless communication with at least one remote client 104 via an antenna, two or more antennas, or an antenna array 208.

As illustrated, an access station 102a is in wireless communication with remote clients 104a(1), 104a(2) . . . 104a(N) via wireless communications or communication links 106a(1), 106a(2) . . . 106a(N), respectively. Access station 102b is in wireless communication with remote clients 104b(1), 104b(2) . . . 104b(N) via wireless communications or communication links 106b(1), 106b(2) . . . 106b(N), respectively.

Each access station 102a and 102b is coupled to signal transmission/reception coordination logic 404 via a link 1102. Specifically, access station 102a is coupled to signal transmission/reception coordination logic 404 via link 1102a, and access station 102b is coupled to signal transmission/reception coordination logic 404 via link 1102b.

Links 1102a and 1102b are likely wired links, but they may instead be wireless links. Although signal transmission/reception coordination logic 404 is shown separately from both access stations 102a and 102b, signal transmission/reception coordination logic 404 may alternatively be co-located at and/or located within an access station 102a or 102b. Additionally, access station 102a and/or 102b may also include internal signal transmission/reception coordination logic 404.

Signal transmission/reception coordination logic 404 as illustrated in FIG. 11 enables signal transmission/reception coordination across multiple access stations 102 to prevent or at least reduce interference. For example, there is potential interference if access station 102a transmits wireless communication 106a(N) to remote client 104a(N) on a particular channel at the same time access station 102b transmits wireless communication 106b(1) to remote client 104b(1) on the same particular channel, especially because of the proximity of remote client 104a(N) to remote client 104b(1). To eliminate this particular interference and ameliorate the overall network interference levels, signal transmission/reception coordination logic 404 restrains access station 102b from transmitting communication signal 106b(1) to remote client 104b(1) when access station 102a is transmitting communication signal 106a(N) to remote client 104a(N), and vice versa.

The above-described inter-access station 102 restraining may include, for example, situations in which coordination logic 404 restrains access station 102b from transmitting to client 104b(1) when client 104a(N) is awaiting a short-term (e.g., an immediate) response to a frame that client 104a(N) transmitted to access station 102a in the recent past. More generally, an implementation may entail restraining transmission from an access point when another access point (e.g., that is part of the same or a different access station 102) that is operating on the same or a different channel (e.g., that is adjacent or otherwise) is expecting an immediate response to a frame that was transmitted by it. For example, this type of transmission restraint may be performed if the configuration of the wireless system is such that transmission by the access point interferes with the reception of the other access point.

Figure 12:
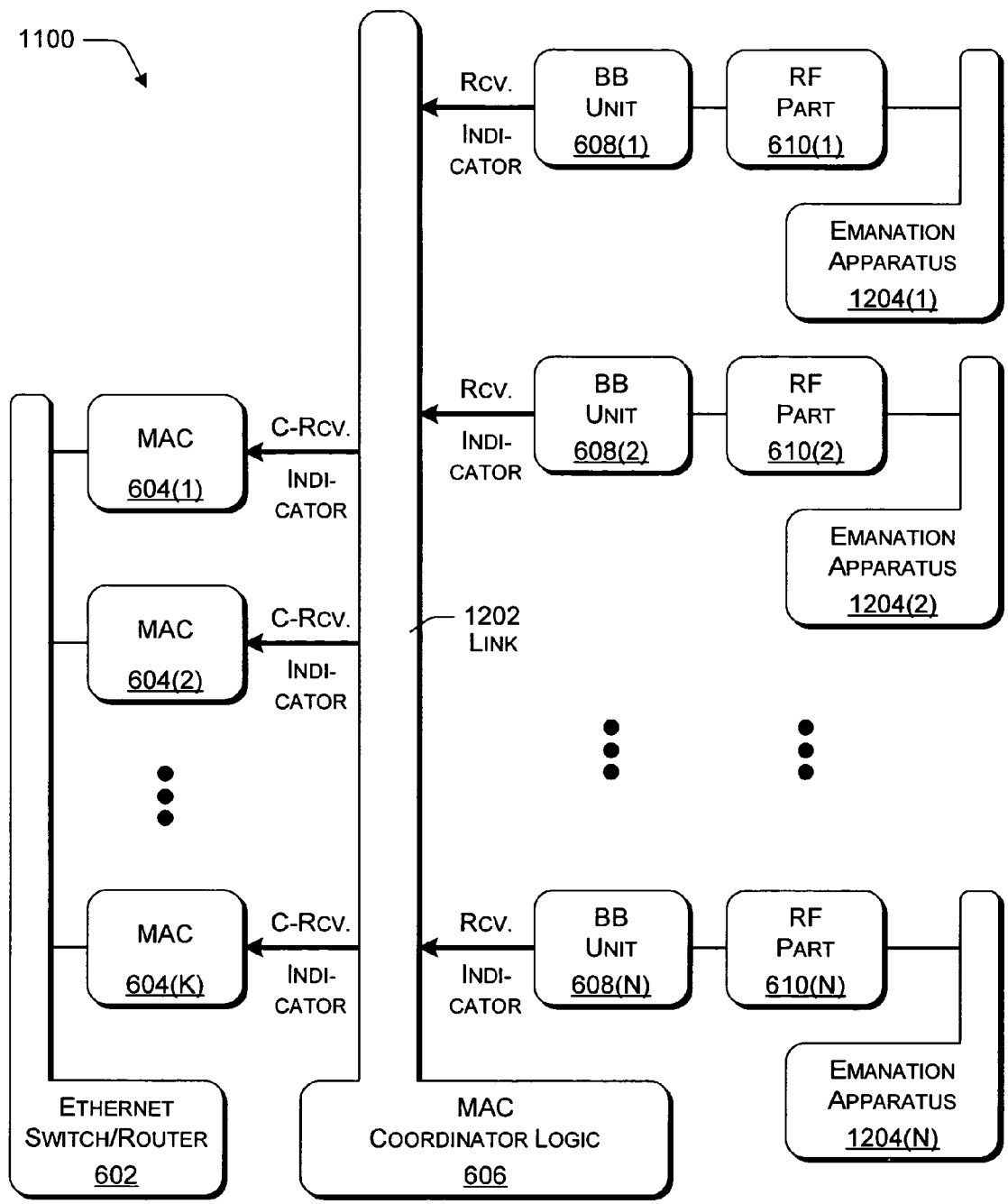
FIG. 12 illustrates an exemplary multiple access station environment that includes MAC coordinator logic.

FIG. 12 illustrates exemplary multiple access station environment 1100 that includes MAC coordinator logic 606. MAC coordinator logic 606 of FIG. 12 logically functions like MAC coordinator logic 606 of FIG. 6 and/or FIG. 8, but it is distributed spatially as indicated by link 1202. Link 1202 is likely a wired link, but it may instead be a wireless link.

As illustrated, a respective emanation apparatus 1204 is coupled to a respective RF part 610. Specifically, RF part 610(1) is coupled to emanation apparatus 1204(1), RF part 610(2) is coupled to emanation apparatus 1204(2), and RF part 610(N) is coupled to emanation apparatus 1204(N). Each emanation apparatus 1204 includes an antenna or antenna array 208 and optionally a beamformer 612.

At least each RF part 610 and emanation apparatus 1204 pair may correspond to an individual access station 102 and/or access point 402. In a described implementation, at least one RF part 610 and emanation apparatus 1204 pair is non-co-located with at least one other RF part 610 and emanation apparatus 1204 pair. At least some of the individual access station(s) 102 and/or access point(s) 402 have at least partly overlapping coverage areas.

Besides being distributed, MAC coordinator logic 606 may operate analogously to a MAC coordinator logic 606 for a single access station 102 environment. In other words, MAC coordinator logic 606 accepts as inputs multiple receive indicators from BB units 608(1, 2 ... N) and produces as outputs multiple constructive receive indicators for associated respective MACs 604(1, 2 ... K). With a distributed MAC coordinator logic 606 that is coupled by link 1202 between or among two or more access stations 102, the thrashing of packets can be reduced, along with general network interference.

In the exemplary multiple access station environment 1100 (of FIGS. 11 and 12), as well as other environments, the overall system performance may also be improved by considering other issues beyond local packet thrashing. The selectability of signal transmission/reception coordination logic 404 (e.g., of FIG. 10) may entail excluding selected MAC(s) from being provided combined receive information that restrains signal transmissions either consistently or in certain situations. Such excluded MACs may be selected when a MAC has higher downlink bandwidth requirements, when a particular MAC's downlink throughput is otherwise low, when a policy-based decision indicates that downlink communications are more important than uplink communications (e.g., a server is operating), and so forth.

Figure 13:
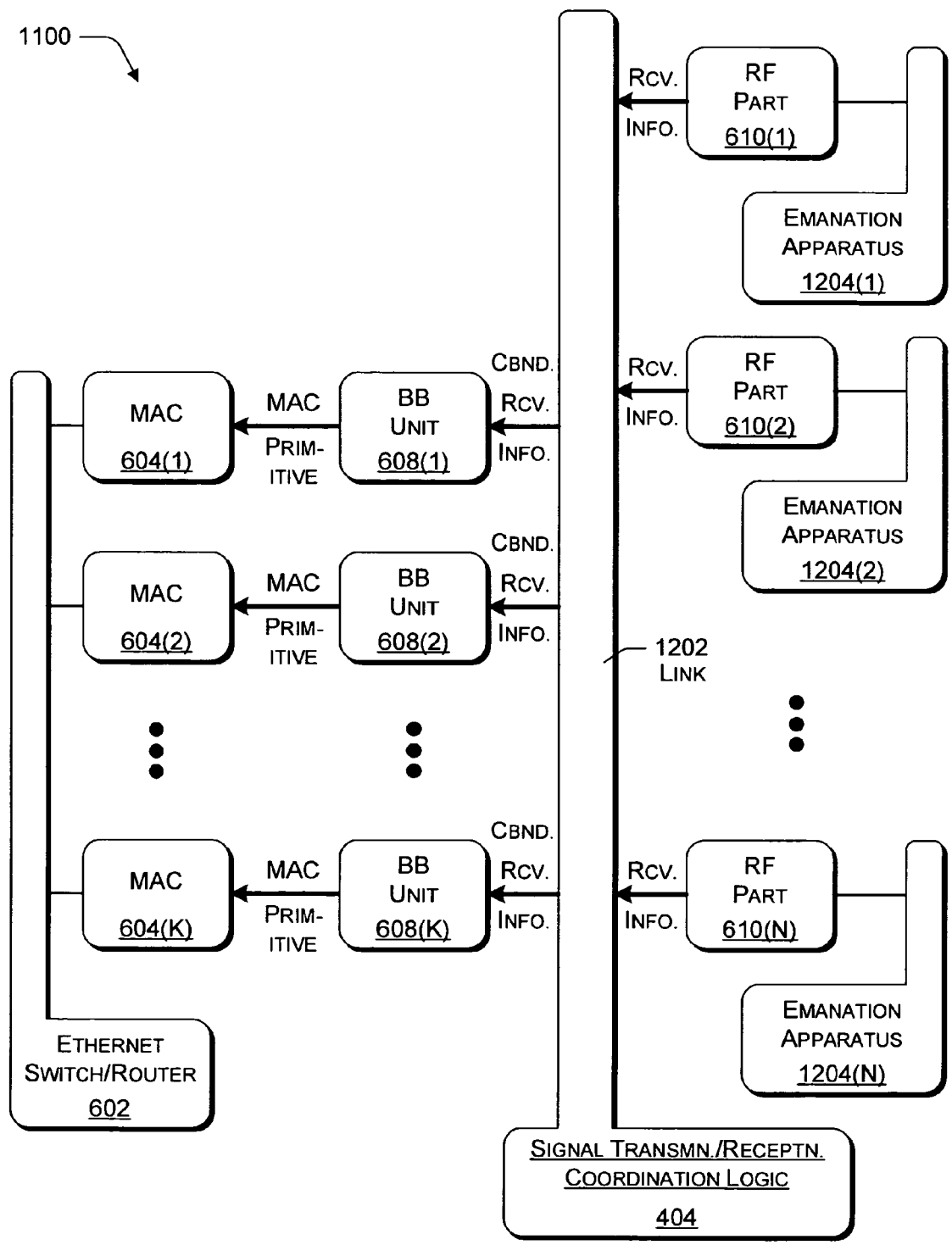
FIG. 13 illustrates a second exemplary multiple access station environment that includes signal transmission/reception coordination logic.

FIG. 13 illustrates a second exemplary multiple access station environment 1100 that includes signal transmission/reception coordination logic 404. MAC coordinator logic 606 of FIG. 12 is an example of a distributed signal transmission/reception coordination logic 404 at a MAC level that optionally uses MAC primitives. On the other hand, signal transmission/reception coordination logic 404 of FIG. 13 operates at a baseband level.

As illustrated, signal transmission/reception coordination logic 404 is distributed across multiple individual access station(s) 102 and/or access point(s) 402 that have at least partly overlapping coverage areas. It should be noted, however, that signal transmission/reception coordination logic 404 is shown operating at the baseband level. Signal transmission/reception coordination logic 404 accepts as inputs receive information from multiple RF parts 610(1, 2 ... N) and produces as outputs combined receive information for multiple respective BB units 608(1, 2 ... K). Respective BB units 608(1, 2 ... K) provide MAC primitives to respective MACs 604(1, 2 , , , K) based on the combined receive information.

In a described implementation for FIG. 13, the receive information comprises at least one received packet that is analyzed by signal transmission/reception coordination logic 404. Implementing signal transmission/reception coordination logic 404 at the baseband layer is typically more complex than implementing it at the MAC layer; however, there is more information and/or flexibility available at the baseband layer, which provides for more options. Furthermore, signal transmission/reception coordination logic 404 may be implemented at the baseband layer in a system that utilizes off-the-shelf chips in which MAC and baseband functionality are integrated into a single chip or chips that may not separately expose desired MAC signal(s) (e.g., MAC primitives).

Signal transmission/reception coordination logic 404 applies one or more coordination functions to the receive information accepted from RF parts 610(1, 2 ... N). The resulting combined receive information is forwarded to BB units 608(1, 2 ... K). Based on the combined receive information, respective BB units 608(1, 2 ... K) provide MAC primitives to associated respective MACs 604(1, 2 , , , K). The MAC primitives can instruct the MACs 604(1, 2 ... K) with regard to whether a signal is being received and/or constructively received by a corresponding RF part 610 and emanation apparatus 1204 pair.

The diagrams of FIGS. 1-13 are illustrated as blocks representing features, devices, logic, functions, actions, some combination thereof, and so forth. However, the order and/or layout in which the diagrams are described and/or shown is not intended to be construed as a limitation, and any number of the blocks can be combined, augmented, omitted, and/or re-arranged in any order to implement one or more methods, systems, apparatuses, access stations, arrangements, schemes, approaches, etc. for signal communication coordination.

By way of example only, the blocks of FIGS. 1-13 (e.g., the components of FIGS. 2, 4, 6, 8, and 10-13 and/or the actions of FIGS. 5, 7, and 9) may be implemented fully or partially as one or more processors and/or as one or more media. Such processors may be general purpose microprocessors, special-purpose digital signal processors, some combination thereof, and so forth. Such media may be transmission or storage media, volatile or non-volatile memory, programmable or hard-wired coding, some combination thereof, and so forth. Moreover, the media may include processor-executable instructions that one or more associated processors are capable of executing.

Furthermore, although the description herein includes references to specific hardware-oriented implementations such as those of FIGS. 2-4, 6, 8 and 10-13 (as well as the exemplary general environment of FIG. 1), the features, logic, devices, and functions thereof as well as the actions of FIGS. 5, 7, and 9 can be implemented in any suitable hardware, software, firmware, or combination thereof and using any suitable coding/logical mechanism(s), wireless protocol paradigm(s), radio frequency technology, and so forth. Additionally, the order in which the multiple blocks for the methods of FIGS. 5, 7, and 9 are illustrated and/or described is not intended to be construed as a limitation and the actions of any number of the described blocks, or portions thereof, can be combined, augmented, omitted, and/or re-arranged in any order to implement one or more methods for signal communication coordination.

Although methods, systems, apparatuses, access stations, arrangements, schemes, approaches, and other implementations have been described in language specific to structural and functional features and/or flow diagrams, it is to be understood that the invention defined in the appended claims is not necessarily limited to the specific features or flow diagrams described. Rather, the specific features and flow diagrams are disclosed as exemplary forms of implementing the claimed invention.

The invention claimed is:

1. An apparatus comprising:
 a wireless input/output (I/O) unit that is configured to establish a plurality of access points; and
 signal transmission/reception coordination logic that is capable of ascertaining, by monitoring the plurality of access points for received signals, that a first access point of the plurality of access points is receiving a first signal and that is adapted to restrain at least two other access points of the plurality of access points from transmitting signal responsive to the ascertaining that the first access point is receiving the first signal;
 wherein the signal transmission/reception coordination logic restrains at least one other access point of the plurality of access points from transmitting the other signal on a first channel responsive to the ascertaining that the access point of the plurality of access points is receiving the signal on a second different channel.

2. The apparatus of claim 1, wherein the plurality of access points established by the wireless I/O unit are co-located.

3. The apparatus of claim 1, wherein the wireless I/O unit operates in accordance with at least one IEEE 802.11 standard.

4. The apparatus of claim 1, wherein the signal received by the access point comprises at least one uplinked packet.

5. The apparatus of claim 1, wherein the signal received by the access point comprises at least a portion of an uplinked packet.

6. The apparatus of claim 5, wherein the at least a portion of the uplinked packet comprises at least part of a preamble of the uplinked packet.

7. The apparatus of claim 1, wherein the signal transmission/reception coordination logic restrains at least one other access point of the plurality of access points from transmitting a downlink signal.

8. The apparatus of claim 1, wherein the signal transmission/reception coordination logic restrains at least one other access point of the plurality of access points while the first access point is receiving the first signal.

9. The apparatus of claim 1, wherein each access point of the plurality of access points corresponds to a communication beam of a plurality of communication beams that emanate from the access station.

10. The apparatus of claim 1, wherein each access point of the plurality of access points is associated with a medium access controller/baseband unit pair.

11. The apparatus of claim 1, wherein the signal transmission/reception coordination logic comprises medium access controller coordination logic.

12. The apparatus of claim 11, wherein the medium access controller coordination logic links two or more access stations.

13. The apparatus of claim 1, wherein the signal transmission/reception coordination logic affects a baseband unit.

14. The apparatus of claim 1, wherein the signal transmission/reception coordination logic affects a radio frequency (RF) part.

15. An apparatus comprising:
 a wireless input/output (I/O) unit that is configured to establish a plurality of access points; and
 signal transmission/reception coordination logic that is capable of ascertaining, by monitoring the plurality of access points for received signals, that:
 a first access point of the plurality of access points is receiving a first signal on a first channel,
 a second access point of the plurality of access points is receiving a second signal that is ongoing on a second channel, the signal transmission/reception coordination logic adapted to restrain at least a third access point of the plurality of access points from transmitting a third signal on a third channel responsive to the ascertaining that the first access point is receiving the first signal and that the second access point is receiving the second signal that is ongoing-on the second channel,
 wherein the restraining at least the third access point prevents degradation to the first and second signals.

16. The apparatus of claim 15, wherein the prevented degradation to the first and second signals comprises inter-modulation distortion.

17. The apparatus of claim 15, wherein the prevented degradation to the first and second signals comprises interference.

18. The apparatus of claim 15, wherein the plurality of access points established by the wireless I/O unit are co-located.

19. The apparatus of claim 15, wherein the wireless I/O unit operates in accordance with at least one IEEE 802.11 standard.

20. The apparatus of claim 15, wherein the signal received by the access point comprises at least one uplinked packet.

21. The apparatus of claim 15, wherein the signal received by the access point comprises at least a portion of an uplinked packet.

22. The apparatus of claim 21, wherein the at least a portion of the uplinked packet comprises at least part of a preamble of the uplinked packet.

23. An apparatus comprising:
a wireless input/output (I/O) unit that is configured to establish a plurality of access points; and
signal transmission/reception coordination logic that restrains transmission from at least two access points when another access point is expecting a short-term response to a frame that was transmitted by said other access point;
wherein the signal transmission/reception coordination logic restrains at least one other access point of the plurality of access points from transmitting the other signal on a first channel responsive to the ascertaining that the access point of the plurality of access points is receiving the signal on a second different channel.

24. The apparatus of claim 23, wherein the short-term response to the frame comprises an immediate response to the frame.

25. The apparatus of claim 23, wherein the other access point is also established by the wireless I/O unit of the access station.

26. The apparatus of claim 23, wherein the other access point is established by a different access station.

27. The apparatus of claim 23, wherein one or more of the at least two access points and the other access point are operating on a same channel.

28. The apparatus of claim 23, wherein one or more of the at least two access points and the other access point are operating on different channels.

29. The apparatus of claim 28, wherein the different channels are adjacent.

30. An apparatus comprising:
a wireless input/output (I/O) unit that is configured to establish a plurality of access points; and
signal transmission/reception coordination logic that is capable of ascertaining, by monitoring the plurality of access points for received signals, that a first access point of the plurality of access points is receiving a first signal on a first channel and that is adapted to restrain at least a second access point of the plurality of access points from transmitting a second signal on a second channel different from the first channel responsive to the ascertaining that the first access point is receiving the first signal.

31. The apparatus of claim 30, wherein the plurality of access points established by the wireless I/O unit are co-located.

32. The apparatus of claim 30, wherein the wireless I/O unit operates in accordance with at least one IEEE 802.11 standard.

33. The apparatus of claim 30, wherein the signal received by the access point comprises at least one uplinked packet.

34. The apparatus of claim 30, wherein the signal received by the access point comprises at least a portion of an uplinked packet.

35. The apparatus of claim 34, wherein the at least a portion of the uplinked packet comprises at least part of a preamble of the uplinked packet.

\* \* \* \* \*